United States Patent
Masberg et al.

(10) Patent No.: US 6,199,650 B1
(45) Date of Patent: *Mar. 13, 2001

(54) DRIVE SYSTEM, ESPECIALLY FOR A MOTOR VEHICLE, AND METHOD OF OPERATING SAME

(75) Inventors: Ullrich Masberg, Rösrath/Kleineichen; Thomas Pels, Overath; Klaus-Peter Zeyen, Köln; Andreas Gründl, München; Bernhard Hoffmann, Starnberg, all of (DE)

(73) Assignees: ISAD Electronic Systems GmbH & Co. KG, Cologne (DE); Grundl und Hoffman GmbH, Starnberg (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,325

(22) Filed: Feb. 27, 1998

Related U.S. Application Data

(63) Continuation of application No. PCT/DE96/01614, filed on Aug. 31, 1996.

(30) Foreign Application Priority Data

Aug. 31, 1995 (DE) .............................................. 195 32 135
Aug. 31, 1995 (DE) .............................................. 195 32 136
Aug. 31, 1995 (DE) .............................................. 195 32 163

(51) Int. Cl.[7] .............................. B60K 29/00; B60T 8/24; B60T 7/12
(52) U.S. Cl. .............................. 180/197; 701/87; 303/141
(58) Field of Search ................................. 180/197, 65.2; 192/12 A, 103 R, 216; 701/82, 87; 303/139, 141, 145

(56) References Cited

U.S. PATENT DOCUMENTS

| | | | |
|---|---|---|---|
| 2,654,849 | 10/1953 | Trofimov | 310/99 |
| 2,790,917 | 4/1957 | Trofimov | 310/102 |
| 3,774,303 | 11/1973 | Burkett et al. | 30/382 |
| 3,870,116 | 3/1975 | Seliber | 180/54 R |
| 3,902,073 | 8/1975 | Lafuze | 290/46 |

(List continued on next page.)

FOREIGN PATENT DOCUMENTS

| | | |
|---|---|---|
| 58401-73 | 1/1975 | (AU) . |
| 282 671 | 8/1912 | (DE) . |
| 874 713 | 6/1952 | (DE) . |
| 893 299 | 1/1953 | (DE) . |
| 904 737 | 6/1953 | (DE) . |

(List continued on next page.)

OTHER PUBLICATIONS

N. Saridakis, "Golf mit Otto–Elektro–Hybridantrieb", ATZ, Atutomobiltechnische Zeitschrift 87 (1985) 11, pp. 581–584.

H. Baumann, Siedekühlgefäss mit Luftrückkühlung für Traktionsstromrichter hoher Leistung:, etzArchiv, vol. 11, 1989, No. 7, pp. 213–220.

(List continued on next page.)

Primary Examiner—Lanna Mai
Assistant Examiner—Jeffrey Restifo
(74) Attorney, Agent, or Firm—Blakely, Sokoloff, Taylor & Zafman

(57) ABSTRACT

Drive system, especially for a motor vehicle, with a drive assembly, especially an internal combustion engine (1), an electric machine (4) and an antislip control, in which the (one) electric machine (4) is designed such that it can produce a reduction of drive slip, in particular by braking action and/or—when the electric machine (4) is acting as a coupling—by clutch slip action.

8 Claims, 7 Drawing Sheets

U.S. PATENT DOCUMENTS

| | | | |
|---|---|---|---|
| 3,974,396 | 8/1976 | Schönball | 290/54 |
| 4,025,860 | 5/1977 | Shibata et al. | 320/3 |
| 4,066,936 | 1/1978 | Hirota | 318/139 |
| 4,346,773 | 8/1982 | Hofbauer et al. | 180/165 |
| 4,660,697 * | 4/1987 | Yoneda et al. | 192/0.033 |
| 4,678,248 * | 7/1987 | Depebrock | 318/805 |
| 4,699,097 | 10/1987 | Tanaka et al. | 123/192 |
| 4,796,718 * | 1/1989 | Thielen et al. | 180/197 |
| 4,797,602 | 1/1989 | West | 322/10 |
| 4,803,376 | 2/1989 | N'Guyen | 290/22 |
| 4,825,139 | 4/1989 | Hamelin et al. | 322/90 |
| 4,883,973 | 11/1989 | Lakey et al. | 290/31 |
| 4,942,950 | 7/1990 | Watanabe et al. | 192/0.096 |
| 4,958,095 | 9/1990 | Uchida et al. | 310/59 |
| 5,053,632 | 10/1991 | Suzuki et al. | 290/45 |
| 5,109,815 | 5/1992 | Maeda et al. | 123/192.1 |
| 5,125,236 | 6/1992 | Clancey et al. | 62/115 |
| 5,126,641 | 6/1992 | Putman et al. | 318/128 |
| 5,150,779 * | 9/1992 | Booth | 192/106 |
| 5,175,439 | 12/1992 | Härer et al. | 307/10.1 |
| 5,303,794 | 4/1994 | Hrovat et al. | 180/197 |
| 5,323,743 | 6/1994 | Kristiansson | 123/179.3 |
| 5,325,042 | 6/1994 | Murugan | 322/10 |
| 5,359,308 | 10/1994 | Sun et al. | 335/216 |
| 5,431,241 | 7/1995 | May et al. | 180/197 |
| 5,799,562 * | 9/1998 | Weinberg | 92/12.2 |

FOREIGN PATENT DOCUMENTS

| | | |
|---|---|---|
| 938 680 | 6/1954 | (DE) . |
| 1 077 072 | 3/1960 | (DE) . |
| 1 156 319 | 10/1963 | (DE) . |
| 1 165 422 | 3/1964 | (DE) . |
| 1 284 853 | 12/1968 | (DE) . |
| 23 45 018 A1 | 4/1974 | (DE) . |
| 23 53 724 B2 | 5/1974 | (DE) . |
| 27 04 533 A1 | 8/1978 | (DE) . |
| 28 55 886 A1 | 6/1979 | (DE) . |
| 29 02 376 C2 | 7/1979 | (DE) . |
| 28 23 225 A1 | 11/1979 | (DE) . |
| 29 17 139 A1 | 11/1980 | (DE) . |
| 29 43 563 A1 | 5/1981 | (DE) . |
| 40 00 678 A1 | 7/1981 | (DE) . |
| 30 09 503 A1 | 9/1981 | (DE) . |
| 30 13 424 A1 | 10/1981 | (DE) . |
| 30 48 972 C2 | 7/1982 | (DE) . |
| 30 50 269 A1 | 10/1982 | (DE) . |
| 32 30 121 A1 | 2/1984 | (DE) . |
| 32 30 607 A1 | 2/1984 | (DE) . |
| 32 43 513 A1 | 5/1984 | (DE) . |
| 33 43 018 C2 | 6/1984 | (DE) . |
| 32 43 514 C2 | 9/1984 | (DE) . |
| 33 35 923 A1 | 9/1984 | (DE) . |
| 33 38 548 A1 | 5/1985 | (DE) . |
| 35 37 994 A1 | 5/1986 | (DE) . |
| 37 37 192 A1 | 7/1988 | (DE) . |
| 38 14 484 A1 | 11/1988 | (DE) . |
| 37 43 289 A1 | 6/1989 | (DE) . |
| 37 43 317 C3 | 6/1989 | (DE) . |
| 38 12 296 A1 | 11/1989 | (DE) . |
| 39 37 082 A1 | 5/1990 | (DE) . |
| 39 26 054 A1 | 2/1991 | (DE) . |
| 40 27 664 A1 | 3/1991 | (DE) . |
| 39 39 695 C1 | 5/1991 | (DE) . |
| 40 38 301 A1 | 6/1991 | (DE) . |
| 41 00 937 A1 | 8/1991 | (DE) . |
| 40 11 291 A1 | 10/1991 | (DE) . |
| 41 34 268 A1 | 4/1992 | (DE) . |
| 42 13 132 A1 | 11/1992 | (DE) . |
| 41 24 496 A1 | 1/1993 | (DE) . |
| 42 02 083 A1 | 7/1993 | (DE) . |
| 42 02 737 A1 | 8/1993 | (DE) . |
| 42 30 510 C1 | 9/1993 | (DE) . |
| 42 25 683 A1 | 2/1994 | (DE) . |
| 43 30 193 A1 | 3/1994 | (DE) . |
| 43 18 949 C1 | 6/1994 | (DE) . |
| 43 39 252 A1 | 6/1994 | (DE) . |
| 43 91 898 C2 | 6/1994 | (DE) . |
| 43 44 053 A1 | 7/1994 | (DE) . |
| 43 11 697 A1 | 10/1994 | (DE) . |
| 43 14 290 A1 | 11/1994 | (DE) . |
| 43 23 601 A1 | 1/1995 | (DE) . |
| 43 23 602 A1 | 1/1995 | (DE) . |
| 44 04 791 C1 | 3/1995 | (DE) . |
| 295 02 906 U1 | 4/1995 | (DE) . |
| 44 02 152 C1 | 4/1995 | (DE) . |
| 44 37 322 A1 | 5/1995 | (DE) . |
| 44 21 512 C1 | 6/1995 | (DE) . |
| 44 08 719 C1 | 7/1995 | (DE) . |
| 44 23 577 A1 | 8/1995 | (DE) . |
| 44 12 945 A1 | 10/1995 | (DE) . |
| 44 12 438 C1 | 11/1995 | (DE) . |
| 0 151 935 A1 | 8/1985 | (EP) . |
| 0 175 952 A2 | 4/1986 | (EP) . |
| 0 233 738 A1 | 8/1987 | (EP) . |
| 0 338 485 A2 | 10/1989 | (EP) . |
| 0 354 790 A2 | 2/1990 | (EP) . |
| 0 385 311 A2 | 9/1990 | (EP) . |
| 0 427 568 A1 | 5/1991 | (EP) . |
| 0 437 266 A2 | 7/1991 | (EP) . |
| 0 440 088 A1 | 8/1991 | (EP) . |
| 0 530 659 A1 | 3/1993 | (EP) . |
| 0 557 522 A1 | 9/1993 | (EP) . |
| 0 569 347 A2 | 11/1993 | (EP) . |
| 0 604 979 A2 | 7/1994 | (EP) . |
| 0 612 928 A1 | 8/1994 | (EP) . |
| 2481656 | 11/1981 | (FR) . |
| 2563280 | 10/1985 | (FR) . |
| 20 42 772 | 9/1980 | (GB) . |
| 55-005454 | 1/1980 | (JP) . |
| 58-126434 | 7/1983 | (JP) . |
| 59-184020 | 10/1984 | (JP) . |
| 61-066820 | 8/1986 | (JP) . |
| 61-200333 | 9/1986 | (JP) . |
| 62-166749 | 7/1987 | (JP) . |
| 1113571 | 5/1989 | (JP) . |
| 1190922 | 8/1989 | (JP) . |
| 4024156 | 1/1992 | (JP) . |
| 05211258 | 8/1993 | (JP) . |
| 07105943 | 4/1995 | (JP) . |
| WO 88/08636 | 11/1988 | (WO) . |
| WO 91/16538 | 10/1991 | (WO) . |
| WO 94/19856 | 9/1994 | (WO) . |
| WO 95/02758 | 1/1995 | (WO) . |
| WO 95/24072 | 9/1995 | (WO) . |

OTHER PUBLICATIONS

E. Blessmann, "Magnetic Couplings", Machine Design, Feb. 9, 1989, pp 105–108.

Robert Bosch GmbH, "Kraftfahrtechnisches Taschenbuch", VDI–Verlag, Düsseldorf, 21 ed. 1991, pp. 346–347; 361; 555–559; 763–767.

H. Deisenroth, C. Trabert: "Vermeidung von Überspannungen bei pulsumrichterantrieben" etz, vol. 114, 1993, No. 17, pp. 1060–1067.

W. Geissler, F. Unger–Weber: "Modelling the Three–Phase Propulsion System of a Modern Multisystem–Locomotive", EPE Firenze, (1991), pp. 4–632–4 637.

G. und H. Häberle, "Elektrische Maschinen in Anlagen der Energietechnik", Verlag Europa–Lehrmittel, Haan–Gruitenm 3. Auflage, 1994, Seiten 169–172.

G. Henneberger, "Elektrische Motoraustrüstung", Braunschweig, 1990, pp. 98–103.

J. Langheim, J. Fetz: "Electric Citybus with two Induction Motors–Power Electronics and Motor Control", ETEP, vol. 2, No. 6, Nov./Dec. 1992, pp 359–365.

"Krafftfahrzeugtechnik" Nov. 1982, pp. 346–347.

Litton prospect "Bürstenloser Hohlwellen–Resolver SSBH–15", Unterföhring.

J. Reinert et al., "Digital Control and Optimization of a Rolling Rotor Switched Reluctance Maching", IEEE Transactions on Industry Appliations, Vo. 31, No. 2, Mar./Apr. 1995, p 338–344.

F. Simovert, "Spannungszwischenkreis–Umrichter Baureihe 6SC44 . . der Fa. Siemens AG", 1985, No. A 19100–E319–A262.

D. Teodorescu, "Kleinantriebe mit Vollpolläufer–Synchronmotoren", ema, May 1993, pp 39–43.

English Translation Abstract of German language cited "Other Art", pp. 9 total.

* cited by examiner

DRIVE SYSTEM, ESPECIALLY FOR A MOTOR VEHICLE, AND METHOD OF OPERATING SAME

This is a continuation of PCT/DE96/01614 filed on Aug. 31, 1996 which claims priority from German patent application No. 195 32 135.9 filed on Aug. 31, 1995, German patent application No. 192 32 136.7 filed on Aug. 31, 1995, and German patent application No. 195 32 163.4 filed on Aug. 31, 1995.

BACKGROUND OF THE INVENTION

1. Field of the Invention

The invention concerns a drive system, especially for a motor vehicle, and a method of operating same.

2. Description of the Related Art

Basically, the transmission of force in motor vehicles—which is responsible for the forward movement of the vehicle—depends on drive slip between tires and road. In general, the starting and acceleration processes occur at low slip values, during which an increase in slip also produces an increase in the useable force closure at first. As it continues to increase, however, the force closure is again reduced, so that an excess drive torque becoming larger under corresponding acceleration leads to a fast rise in rotary speed of a drive wheel or the drive wheels.

A regulating of the drive slip, i.e., a so-called drive slip control (ASR), prevents such a spinning of the drive wheels and regulates the drive slip down to permissible values. Such drive slip controls are known in the state of the art (see, for example, "Automotive Handbook," publisher: Robert Bosch GmbH, Düsseldorf, 21st Ed., 1991, pp. 555–559).

Regulation of drive slip—in the state of the art—is accomplished in that the driving moment is reduced upon reaching a limit value of drive slip or a change in the drive slip over time (time derivative). Reduction of the drive torque is accomplished either by adjustment of the engine, i.e., by throttle valve adjustment or by ignition time adjustment, or by activating one or more wheel brake(s). A combination of both measures is also known. In particular, in addition to the engine adjustment, which occurs when exceeding a first limit value of the drive slip, the wheel brakes can be activated when a second, higher limit value of drive slip, is attained.

The drawback to these known drive slip controls is that, first, the engine adjustment is slow and sluggish and, secondly, the overall drive slip control is hard to manage, i.e., it is almost never possible to achieve a particular decrease in drive torque over time.

SUMMARY OF THE INVENTION

A drive system comprising a drive assembly (1), at least one electric machine (4); and a drive slip control, in which the (or one) electric machine (4) is designed such that it can produce a reduction in drive slip; in particular, by brake action and/or—when the electric machine is acting as a coupling—by clutch slip action.

BRIEF DESCRIPTION OF THE DRAWINGS

The invention shall now be explained more closely by means of sample embodiments and the enclosed schematic drawing. The drawing shows.

DETAILED DESCRIPTION OF THE EMBODIMENTS

Figure 1:
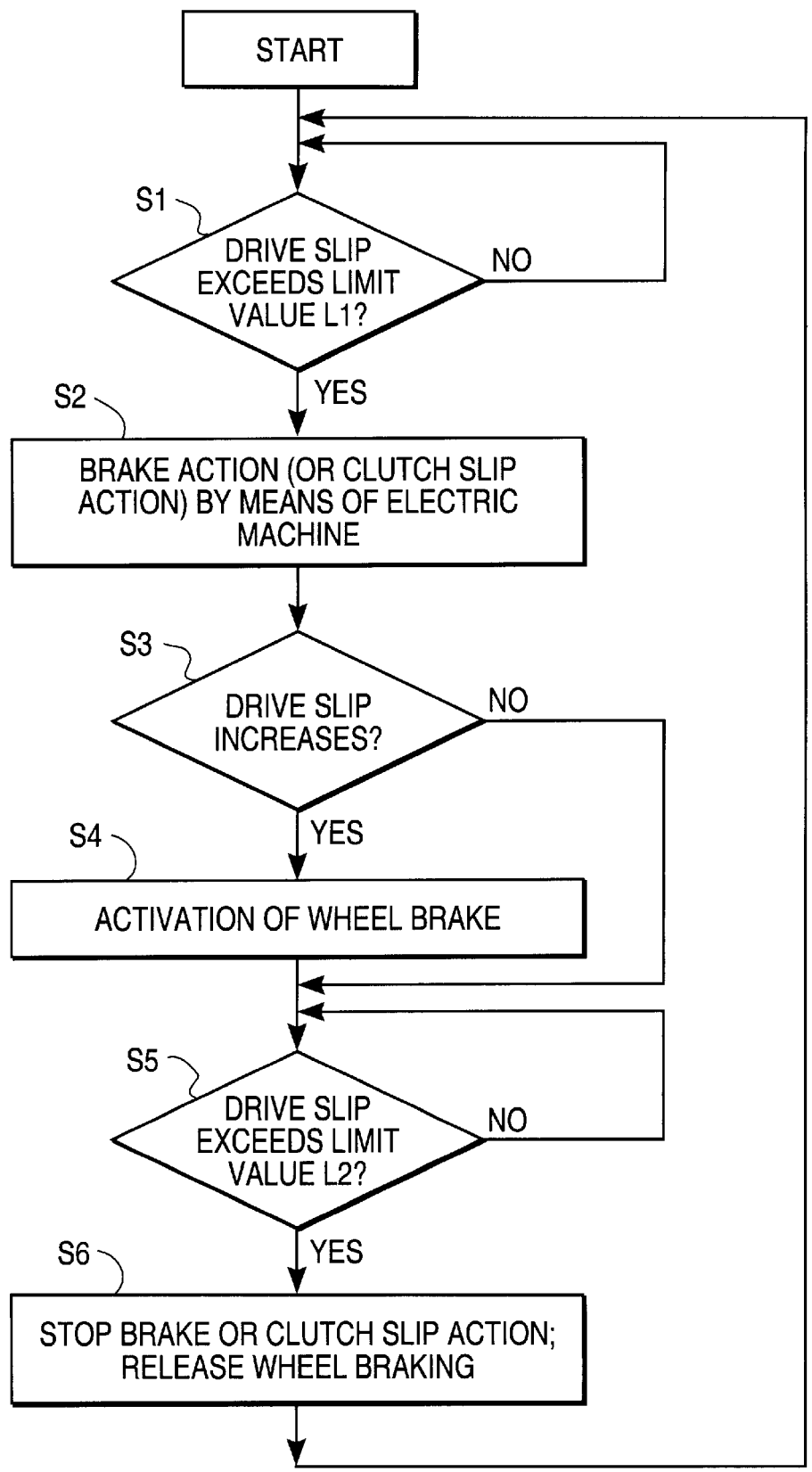
FIG. 1 a schematic representation of a control sequence of the ASR control system.

The invention is based on the technical problem of modifying and improving the known drive slip controls.

This problem is solved by a drive system, with a drive slip control, in which the (or one) electric machine is designed such that it can produce a reduction in drive slip by decreasing the drive torque (of the drive assembly), in particular, by braking action and/or—when the electric machine acts as a coupling—by clutch slip action (claim 1).

In the drive system according to the invention, the drive slip reduction is generally active only when—as in the state of the art—a certain condition is fulfilled. This condition can be the exceeding of a limit value of the drive slip or a limit value of the change in the drive slip over time. But the condition can also be defined more complexly, say, in the sense of a combination of both of the above-mentioned conditions, or even other conditions.

If, now, a defined condition is fulfilled, the drive moment acting on the drive wheels is reduced briefly (and not persistently) by means of the electric machine.

The advantages of such a drive slip control lie in that the drive slip control works quickly and not sluggishly and, thus, the reduction of the drive slip is ideally controllable. Thus, traffic safety is also improved on the whole.

An "electric machine" is any kind of machine for rotational movements which can operate both as an electric machine and also as an electric brake, or as a generator.

Basically, the coupling of the electric machine to a drive shaft of the drive assembly can be indirect, e.g., through a transmission. Preferably, however, it is a direct coupling, in which, e.g., the rotor of the electric machine—similar to a flywheel—sits directly on the shaft or a possibly coupled extension of the shaft and is firmly coupled or can be coupled without intervention of a transmission (by pinions, means of traction, or the like) to the shaft or the extension.

Additional advantageous modifications of these drive slip controls by electric machine are listed below.

1. The drive slip control by electric machine replaces the familiar drive slip control of the state of the art using engine adjustment or wheel braking (claim 2) or is used in combination with the familiar drive slip control of the state of the art by engine adjustment and/or wheel braking (claim 3). These different measures of reducing drive slip need not be carried out simultaneously, but can also be implemented in succession—e.g., when additional limit values are exceeded—in particular, when individual measures are not effective enough. For example, the wheel brakes—which are especially subject to wear—can be used first in especially critical situations.

2. The reduction of drive torque or a braking of the shaft driving the drive wheels can occur, in particular, as described below:
   a) The electric machine can be designed such that it can be used as an eddy current brake (claim 4). Thus, the drive torque can be reduced when the electric machine is operating as eddy current brake.
   b) The electric machine can be operated as a generator (claim 5). The current thus generated can either be converted into heat, e.g., through heating resistors, or saved up for later use (claim 6). In this way, an energy recovery can occur. Thus, this leads to greater overall efficiency.
   c) A mechanical coupling can be shifted between the electric machine and the drive assembly, which can be automatically activated and opened partly or entirely when the drive torque is supposed to be reduced (claim 7). The electric machine then works only as a brake and the drive assembly is basically separated from the drive wheels.

3. Reduction of the drive slip occurs by allowing a clutch slip in the electric machine operating as a clutch or by increasing an already present clutch slip. If, furthermore, the electric machine acting as a clutch has a mechanical bridge coupling, this is first released and only then is the clutch slip permitted and increased.

Basically, the reduction of the drive slip can be regulated not only through the clutch slip—i.e., passively—but also actively by the electric machine in generating a braking countertorque—acting on the shaft which is driving the drive wheels.

By rotary-field machine—in contrast with a commutator machine—is meant a machine in which a rotary magnetic field occurs. This can be, for example, an induction or synchronous machine, especially for three-phase current, or a machine with electronic commutation. In a rotary-field machine, the magnetic field sweeps through a complete 360° revolution, while in a traveling-wave machine it only sweeps through one or more segments (sectors). Thus, for example, the traveling-wave machine can be an induction or synchronous machine whose stators extend only across one or more sectors of the rotor—resembling one or more curved linear motors.

Preferably, the drive system has at least one invertor. The invertor can generate the voltages and/or currents needed for the magnetic fields (in particular, rotary or traveling fields) with any desired (within certain limits) frequency, amplitude or phase, or any desired combination of these quantities. It can do this advantageously by means of electronic switch from a predetermined dc or alternating voltage or a predetermined direct or alternating current (so-called pulse invertor). To special advantage, all three quantities—frequency, amplitude and phase—are freely selectable.

Preferably, the electric machine also has the function of an active reduction of rotational nonuniformities.

Proposals for devices for reduction of rotational nonuniformities of an internal combustion engine are disclosed by, e.g., Patent Abstracts of Japan, Volume 11, No. 28 (M-557), Jan. 27, 1987 & JP-A-61 200 333 (NISSAN I), Patent Abstract of Japan, Volume 4, No. 29 (M-002), Mar. 14, 1980 & JP-A-55 005 454 (TOYOTA), EP-B-0 427 568 (ISUZU), DE-A-32 30 607 (VW), EP-B-0 175 952 (MAZDA), Patent Abstracts of Japan, Volume 7, No. 240 (M-251), Oct. 25, 1983 and JP-A-58 126 434 (NISSAN II), DE-A-41 00 937 (FICHTEL & SACHS), DE-A-40 38 301 (HITACHI/NISSAN), EP-A-0 440 088 (NISSAN III) and EP-A-0 604 979 (NIPPONDENSO).

In particular, rotational nonuniformity can be such as occurs in an internal combustion engine, particularly a piston engine with internal combustion, through the gas and mass forces of the individual pistons acting on the drive shaft (i.e., especially the crankshaft). For example, in a four-cylinder four-stroke engine, relatively large rotational nonuniformity occurs in the second order (i.e., twice the rotational frequency of the engine); correspondingly, in a six-cylinder, four-stroke engine, it occurs in the third order. Furthermore, there is rotational nonuniformity at higher orders, as well as stochastically occurring nonuniformities. The internal combustion engine can be, e.g., a two-stroke or a four-stroke engine with an even number of cylinders (e.g., 2, 4, 8, 10, 12 cylinders, etc.) or an odd number of cylinders (1, 3, 5, 7, 9, 11, etc., cylinders) (which may operate by the Otto or the Diesel principle). In theory, it can also be a different kind of internal combustion engine, such as a piston engine with external combustion (so-called Stirling engine). Another possibility is a rotary engine (e.g., a Wankel engine), in which at least the gas forces can produce rotational nonuniformity.

But the system is not only suitable for active reduction of rotational nonuniformity produced by a drive assembly (e.g., that of a motor vehicle or a rail vehicle) as is the case in the above-mentioned examples. Rather, it can also deal with rotational nonuniformity arising in a power train—i.e., between the drive assembly and the takeoff point, through universal joints, three-dimensional shaft vibrations, or gear wear, for example.

A drive system could also be outfitted with several electric machines, e.g., a first machine in a motor vehicle could act directly on the crankshaft of the drive assembly (internal combustion engine), while a second machine is arranged downstream from the coupling, e.g., between coupling and transmission.

The electric machine is preferably controlled such that it produces a rapidly varying, especially alternating torque (variable torque) to reduce the rotational nonuniformity, namely, a braking torque for a positive rotational nonuniformity and a driving torque for a negative rotational nonuniformity. In comparison with this, the torques which the electric machine applies for the ASR function (braking or clutch slip) generally vary slowly; they are therefore termed hereafter constant torques. The electric machine can generate, at least some of the time, additional positive or negative constant torques for additional functions to achieve a driving action or a braking or generator-type action. In configurations in which the electric machine also acts as an electromagnetic coupling, a rapidly varying coupling slip of larger or smaller magnitude can take the place of the rapidly alternating braking and driving torque.

By "rapid variation" is meant a variation in the frequency range of the rotational nonuniformity being reduced, i.e., for the second-order rotational nonuniformity at a rotary speed of 3000 $\text{min}^{-1}$ a variation with a frequency of 100 Hz. On the contrary, the possibly superimposed constant torque generally varies slowly (or is even constant)—apart from possibly steep edges at the beginning or end of the superpositioning.

Thanks to the (especially additive) superpositioning of the constant torque in the desired direction and strength, the reduction of the rotational nonuniformity and the generation of the constant torque are decoupled from each other. The rapidly varying torque (alternating torque) is practically unchanged in its duration by the superpositioning, being only shifted relative to the zero line. As an exception, the rapidly varying torque changes only if the internal combustion engine actually shows an altered rotational nonuniformity on account of the change in load accompanying the switching in of the additional torque.

If the constant torque being furnished at the moment is smaller than the amplitude of the alternating torque at that time, the combined torque of the electric machine shows alternately positive and negative values—albeit shifted with respect to the zero line. If, on the other hand, it is larger than such, the combined torque is only positive or negative, and its magnitude contains a rapidly varying component. A constant braking torque can serve to make the electric machine diminish the slip of a drive wheel as part of an antislip control, act as a generator for current supply and/or produce or sustain a braking of the vehicle. The braking energy (constant torque brake energy) obtained when using this brake function as a generator and the energy accruing during a positive rotational nonuniformity (rotational nonuniformity brake energy) can be saved up advantageously at least partly to achieve the highest possible overall efficiency (for example, in an electrical accumulator or in a flywheel accumulator) and later used as drive energy, to energize a network to feed the vehicle's battery, and/or to reduce negative rotational nonuniformities. A constant drive torque can, e.g., sustain (when the electric machine functions as a "booster") or produce an acceleration of the vehicle, for example, to cover acceleration gaps, as in the case of a turbocharged engine.

The saving of the alternating torque brake energy and/or the constant torque brake energy can be done in particular by an electrical accumulator or a mechanical accumulator (flywheel accumulator): the electrical accumulator can be, for example, a capacitance, an inductance and/or a (fast-acting) battery. An invertor, if present, is advantageously an intermediate-circuit invertor, whose intermediate circuit has the electrical accumulator for brake energy or is coupled to at least one such accumulator. It can either serve exclusively for the accumulation of brake energy (in this case, it will be switched in generally in addition to a normally present intermediate-circuit accumulator, which can furnish the necessary voltage or current pulse during the invertor's operating cycle), or it can serve only partially for the accumulation of the brake energy, i.e., save up yet other energy—which may be needed for the operating cycle (in the latter case, it could coincide with the usual intermediate-circuit accumulator). Moreover, it may be advantageous in any case to design the rectifier as an intermediate-circuit rectifier—for example, even without intermediate accumulation of brake energy.

By an "intermediate circuit" is meant a circuit which can supply essentially dc voltage or direct current, from which an invertor component (the so-called machine invertor) can form variable alternating voltage or current by pulse or cycle operation. This dc voltage or direct current must provide voltage or current pulses with extreme edge steepness and at high voltage or current level. Generally speaking, an intermediate-circuit invertor comprises three subassemblies, namely, an input subassembly for supplying or taking away electrical energy, an output subassembly in the form of the machine invertor, and the intermediate circuit which comes between these.

In a flywheel accumulator, the flywheel can preferably be electrically coupled to the system by an (additional) electric machine. This can be, for example, a rotary-field or commutator machine controlled by its own rectifier. The (first) electric machine and the flywheel machine work in opposite cycle: when the former is braking, the latter is accelerating the flywheel, and when the former is driving or not braking so much, the latter is braking the flywheel. Relatively high energy densities can be built up with such a flywheel energy accumulator.

As mentioned above in connection with the constant torque, the electric machine can also perform other functions at the same time or staggered in time from the ASR function and the rotaional nonuniformity reduction, if present, and thus replace machines which are traditionally specialized in these functions. In particular, it can also have the function of a starter for the drive assembly and/or the function of a generator for electricity supply, e.g., to charge a battery or energize a power grid. If both functions are implemented, the machine constitutes a starter/generator, which can replace the two separate corresponding machines which are traditionally present. During the starting process, it is generally not necessary to reduce rotational nonuniformity; for this, the electric machine will be operated temporarily as a pure electric motor. On the other hand, the generator function can also be desirable when reducing rotational nonuniformity. Averaged out over time, a gain in electric energy is achieved by superimposing the alternating torque with a simultaneously braking torque.

Basically, the electric machine can be configured as a flywheel starter for the starting function (see, e.g., Henneberger, "Electrical Engine Equipment", Braunschweig 1990, pp. 98–103). Advantageously, however, it has such a torque-robust construction that it can serve as a direct starter, i.e., it can start the engine by merging in from standstill. Preferably, it is coupled directly to the drive shaft, i.e, without a transmission. The rotary speed of the rotor then preferably equals the rotary speed of the drive assembly. Advantageously, the rotor (or perhaps its rotationally mounted stator) sits on the drive shaft (usually the crankshaft) of the engine or an extension (which can perhaps be decoupled from it). It is preferably firmly coupled or coupleable to the drive shaft or the extension.

In corresponding manner, the electric machine can also produce or sustain an acceleration and/or braking of the shaft as an additional function besides the ASR function, in order to accelerate or brake the motor vehicle (possibly in conjunction with the drive assembly). For braking the vehicle, the electric machine—as already mentioned—can serve as a wear-free, possibly generator-type brake or extra brake.

The brake energy obtained when employing these additional functions can [be saved?]—as mentioned above—and later used as drive energy or be supplied to a network or, for example, the car battery. In order to achieve the highest possible efficiency of brake energy recycling when braking the vehicle by means of the electric machine, it is advantageous to separate the electric machine from the drive assembly by means of an intervening, e.g., mechanical coupling during braking.

To supply high-power consumers, such as auxiliary machines (air conditioners, servo-drives, pumps) and heating systems, it is preferable that the electric machine furnish current at relatively high voltage level, preferably in the upper part of the low voltage region, where no special electrocution protection measures are necessary (e.g., around 60 V dc voltage). If one goes beyond this, a range of 250–450 Volts is preferably selected. Advantageously, the high-power consumers are electrically operated (or heated) at these high voltage levels (instead of being mechanically operated, as heretofore, or operated with waste heat). Such a high voltage level can already exist, in particular, in the intermediate circuit of an intermediate-circuit invertor, and thus need not be specially generated for this additional purpose. For low-power consumers, a traditional low-voltage network (12 V or 24 V) can be provided.

The active reduction of rotational nonuniformity—as mentioned—is based on the fact that the electric machine can counteract positive and negative rotational nonuniformity, and thus acts as a brake for positive and as a drive for negative rotational nonuniformity. For this, the control device requires information about the time and possibly the magnitude of a positive or negative rotational nonuniformity. One possibility of obtaining this information lies in a measuring of the momentary rotational nonuniformity or another quantity connected to it. If the operation of the electric machine is based on this information, we have an automatic (feedback) control, since the actual presence of a rotational nonuniformity leads to an immediate action on this rotational nonuniformity. Another possibility is to use not the actual, but rather an expected rotational nonuniformity as information for operating the electric machine. Thus, we have here a (nonfeedback) control. For example, in an internal combustion engine, one can determine the magnitude and direction of the momentary rotational nonuniformity as a function of the (crank) shaft angle and one or more additional operating parameters (such as rotary speed and throttle valve position) by using a prototype or simulation on a computer and outfit each mass produced engine with this information saved in the form of a characteristic diagram. During operation, the system then measures the momentary crankshaft angle present and the other operating parameters (such as rotary speed and throttle valve position), reads the corresponding memorized diagram values for magnitude and amplitude of the anticipated rotational nonuniformity, and controls the electric machine through the control device in order to counteract the rotational nonuniformity. Mixed forms of closed-loop and open-loop control are also possible. The metered quantity need not immediately be the rotational nonuniformity (possibly derived from a measurement of the angle position or angular velocity as a function of time). Instead, it can also be one (or more) other quantities which allow a conclusion as to at least some of the rotational nonuniformities occurring, e.g., the gas pressure in one or more engine cylinders or the instantaneous torque of the engine, which can be measured, e.g., by means of a torque hub.

The electric rotary-field machine or traveling-wave machine (or linear machine) of the system is preferably an induction machine, a synchronous machine, or a reluctance machine, especially for three-phase current. An induction machine generally has a relatively simple rotor (generally a rotor with short-circuit windings or windings whose ends go to slip rings). On the other hand, synchronous machines have rotors with distinct poles, which are energized by permanent magnets or electromagnets, which are energized, e.g., by slip rings. Reluctance machines belong to the synchronous machines in the broad sense. In particular, the control of the electric machine in the case of the induction machine is preferably based on a field-oriented automatic control (so-called vector control). Starting with directly measurable momentary quantities, such as the imposed voltage, stator current, and perhaps rotary speed, using a computerized dynamic machine model, the stator current is broken down into a torque-forming component, which generates the torque with the rotor flux, and a component perpendicular to this, generating the machine flux, thus determining the torque.

The electric machine plus associated control unit is generally an auxiliary system, which is arranged, for example, in the drive train of a motor vehicle with an internal combustion engine as the main system. Because of its auxiliary nature, it should take up little space relative to the main system, and therefore should be as compact as possible. The advantageous measures mentioned hereafter serve such a compact construction—besides other advantageous purposes.

One step for achieving good compactness is for the electric machine to have a fine pole division, in particular, at least one pole per 45° angle of the stator. In a full-circle (360°) machine, this corresponds to a total of at least 8 poles. Even smaller polar divisions are especially advantageous, corresponding to 10, 12, 14, 16 or more poles in the closed-circle machine. A fine polar division allows the stator winding heads to be small, both in the axial and the peripheral direction of the machine, so that the machine can be shorter overall in the axial direction. Also, with a finer pole division, the stator back for the return magnetic flux can be thinner (and, thus, also lighter), with the result that the rotor can have a larger diameter for the same outer diameter of the machine. A larger rotor diameter leads to a larger torque, on account of the longer air gap in the peripheral direction and the larger active lever arm. Thus, on the whole, a finer pole division leads to a lighter and more compact machine. In addition, the resistive losses are less on account of the shorter length of the winding wires—smaller winding heads require less nonactive winding wire. Since, moreover, the stray field (which essentially determines the reactive power component) depends on the winding head surface, it is relatively slight for a fine pole division. A slight stray field is especially advantageous for reducing the rotational nonuniformity, because in this case—unlike a conventional electric machine—there is an ongoing alternation between engine and generator operation and reactive power must be continuously consumed with the corresponding pole reversal.

Fine pole divisions are not customary for high-speed rotary-field machines, since they result in a relatively high frequency of pole reversals. A customary value for the pole reversal frequency is 120 Hz, for example. The electric machine used in the context of the invention, on the other hand, preferably has a high maximum pole reversal frequency, preferably between 300 and 1600 Hz or more, especially preferably between 400 Hz and 1500 Hz.

In order to lessen the influence of eddy currents in the stator—which increase with higher pole reversal frequency—the stator preferably has thin stator plates, preferably with a thickness of 0.35 mm or less, especially preferably 0.25 mm or less. As a further measure for diminishing the losses, the stator plates are preferably made from a material with low remagnetization losses, especially less than 1 W/kg at 50 Hz and 1 Tesla.

As a further measure contributing to a compact construction, the electric machine preferably has an inner fluid cooling. The fluid can be preferably oil. A very effective cooling technique consists in placing the machine entirely under oil in the interior. However, a disadvantage of this is that turbulence losses occur above around 500 rpm, and these can take on noticeable extent above roughly 2000 rpm. In order to counteract this, the supply of cooling fluid is preferably dependent on the loss power and/or rotary speed, and the fluid cooling is preferably a spray fluid cooling. There is then always only as much cooling fluid in the machine as is required at the time to carry away the loss power.

Quantitatively, the compactness can be expressed in terms of the "torque density." Preferably, the electric machine has a high torque density—as compared to the maximum torque—which is especially preferably greater than 0.01 Nm/cm$^3$.

Radial vibrations can also often occur on a shaft with rotational nonuniformities, especially the crankshaft. In order to be robust to radial vibrations, the system is preferably designed such that the electric machine works far into the region of magnetic saturation. A measurement of the magnetic saturation is the current coverage (at maximum torque) in the stator per centimeter length of the air gap in the peripheral direction. Preferably, this measure amounts to at least 400–1000 A/cm, especially preferably at least 500 A/cm. Operation far into the saturation range makes it possible to design the machine with relatively broad air gap. Changes in the air gap—such as occur during radial vibrations—have little effect, due to the operation in the saturation range.

Such a compact-construction electric machine generally has relatively low inductance. Yet in order to achieve, for example by means of a synchronized voltage, the most precise sinusoidal current to generate the electrical rotary fields or traveling waves, the invertor here preferably works at least sometimes with a higher cycle frequency, in particular, 10 kHz to 100 kHz or more. This provision is also advantageous for achieving a high temporal resolution for the system: for example, with a cycle frequency of 20 kHz, one can achieve a temporal resolution in the torque behavior of the electric machine of 2 kHz, with which one can effectively reduce a rotational nonuniformity at 200 Hz (200 Hz corresponds, for example, to the fourth order at 3000 rpm). A high cycle frequency also contributes to a compact construction for the invertor itself, since it allows smaller intermediate circuit capacitors, which can be placed directly next to the electronic switches with short conductor pathways. Moreover, EMC (EMC: electromagnetic compatibility) filters of the invertor can be smaller.

As a further advantageous provision for achieving a compact construction of the invertor, electronic switches of the invertor are fluid-cooled, preferably boiling bath cooled. As the boiling bath coolant, one can use a fluorohydrocarbon, for example. In boiling bath cooling, the coolant evaporates at hot spots and in this way obtains its relatively high heat of evaporation from them. The vapor rises and can condense, for example, in an external cooler, thereby surrendering its heat of evaporation. This cooling technique enables the most compact arrangement of the electronic switches of the invertor without any cooling body. Furthermore, it has the advantage that relatively slight temperature differences are enough to achieve even high cooling performance, namely, a difference of 2–10° C., compared to around 40° for air cooling. Another advantageous cooling technique consists in connecting several electronic switches of the invertor, especially 2–20 or more, in parallel. The parallel circuit yields a distributed arrangement of heat sources and, thus, a relatively low loss power density.

The invertor preferably contains semiconductor elements as switches, preferably fast semiconductor switches, such as field effect transistors—especially preferably metal oxide semiconductor (MOS) field effect transistors, bipolar transistors, and/or bipolar transistors with insulated gate connection (IGBTs). By "fast" semiconductor switches are meant, in particular, ones which allow maximum clock frequencies of 10–100 kHz or more.

The invertor generates the voltages and/or currents necessary for the magnetic fields of the electric machine, preferably through pulses, especially on the basis of pulse width or pulse amplitude modulation. With constant intermediate circuit voltage, nearly sinusoidal currents of arbitrarily adjustable frequency, amplitude, and/or phase can be generated by sine-evaluated pulse width modulation at high clock frequencies, thanks to the machine inductance. In pulse amplitude modulation, one starts, for example, with an invertor with variable intermediate-circuit voltage and thus generates pulses of different amplitude.

In order to identify the instantaneous angular position of the shaft at any time in the system, the electric machine or the shaft is advantageously outfitted with a rotor position or shaft position pickup. From the information on the instantaneous angle position, a conclusion can be drawn as to the instantaneous angular velocity and acceleration and, thus, the instantaneous rotational nonuniformities. In an automatic control system, the reduction of the rotational nonuniformity can be based on this information—as explained above. In an open-loop control system, the information on the instantaneous angle position and possibly the instantaneous mean rotary speed is used to read out the correct expectation value from the characteristic diagram. To obtain the most precise angle position information possible, a rotation transformer (so-called "resolver") can be used in particular, i.e., a transformer with translation ratio dependent on angle. High-resolution encoders can also be used for this purpose, e.g., a combination of a high-resolution incremental pickup and a simple absolute pickup.

For the open-loop or closed-loop control of the electric machine with ASR function and possibly other functions, one or more sensors and/or one or more quantities derived from sensor information are provided from the following group: velocity, lengthwise and transverse acceleration, all of these for the vehicle; angle position, rotary speed, angular acceleration, these being for one or more wheels of the vehicle; slip for one or more drive wheels; drive shaft angle position or rotary speed or angular acceleration, load condition, temperature, exhaust composition, quantity or mass of combustion air, throttle valve position, fuel quantity, injection time, gas pressure, all of these for the drive assembly; current used to drive the electric machine, intermediate-circuit voltage, frequency, phase, switching states of the invertor switches, all of these for the invertor (if present); angle position, rotary speed, angular acceleration, torque, all of these for the electric machine; rotary speed of the transmission takeoff shaft. From the electrical quantities of current, intermediate-circuit voltage frequency, phase, and/or from switch states of invertor switches, a conclusion can be drawn as to the instantaneous flux, the instantaneous torque, and the instantaneous rotary speed without additional sensors.

Traditionally, one uses friction-closure couplings in drive systems of motor vehicles, which enable a starting of the vehicle with torque transformation ("grinding clutch") in the starting phase. A further task consists in allowing a gear shifting by separating the drive assembly from a shift transmission and subsequent reconnection with an adjustment of the rotary speed of drive assembly and transmission provided by friction. Moreover, hydrodynamic clutches are known, some of them with a transformer function.

Instead of or in addition to such couplings, one can advantageously configure the electric machine such that it acts as an electromagnetic coupling in the drive train. In an "electromagnetic coupling," the transmission of torque occurs through the coupling by electrical, magnetic, or electromagnetic forces. It is possible for this type of force transmission to occur only temporarily, for example, after achieving the same rotary speed for the shafts being coupled the force transmission can be taken over by a mechanical coupling. In this configuration, the ASR function can be implemented by clutch slip. Any mechanical bridge coupling which is present will have to be quickly released in this process. As an auxiliary function, the electromagnetic coupling can serve as an active transmission synchronization.

In one advantageous embodiment, the system comprises two electric machines for the function of the electromagnetic coupling, i.e., a dual electric machine. In the normal operation—when the drive momentum produces torque via the drive train—the first electric machine functions as a generator and the second as a motor, while the electric energy needed to operate the motor is essentially derived from the generator. Thus, in this configuration, the mechanical rotational energy furnished by the drive is first transformed into electric current by a pair of relatively rotating electromagnetic active surfaces (stator and rotor of the first electric machine) and then changed back by a second pair of relatively rotating electromagnetic active surfaces (stator and rotor of the second electric machine) into mechanical rotational energy, possibly at different rotary speed and with different torque. The quantum of energy put out by the first machine can be larger or smaller than that taken up by the second machine. The excess or deficit can be saved in an energy accumulator or withdrawn from such, respectively. When drive slip is present, the torque produced by the second machine is reduced—this corresponds to a clutch slip.

In the other advantageous configuration, the coupling is formed by a single electric machine, which has at least two rotary electromagnetic active units (e.g., rotor and rotary-mounted stator), one of which is coupled or can be coupled to a torque transmitter at the drive end (e.g., the drive shaft coming from the drive assembly) and the other to a torque transmitter at the takeoff end (e.g., the takeoff shaft going to the transmission). The machine corresponds, e.g., to a normal machine with rotor and stator, which can rotate as a whole in addition to the rotor's rotation. The rotating machine can generate positive and negative relative torques between rotor and "stator." In this way, the clutch slip can be caused to vanish and, thus, the function of a traditional clutch be simulated. Any desired clutch slip values can be achieved for the ASR function by appropriate actuation of the electric machine.

To minimize the electrical losses, the torque transmitters which separate the electromagnetic coupling, can be connected advantageously to a bridge coupling, especially a mechanical coupling. This may involve, for example, a friction-closure coupling or—since it can always be coupled in by appropriate control with vanishing clutch slip—advantageously a positive-closure coupling, such as a claw clutch. Instead of providing a separate coupling, it is also possible to bring the two rotors of the dual machine or the two active units of the single machine into friction or positive closure with each other by axial shifting.

In advantageous configurations, the rotary stator can be prevented from turning and perhaps be configured such that it can be decoupled from its corresponding torque transmitter. This restraining and decoupling can be mechanically produced, say, by placing a friction or positive locking coupling between the stator and one firm part (e.g., the housing of the drive assembly or transmission or the vehicle's chassis) and by releasing such a coupling between the stator and the torque transmitter. As an alternative, this switching from rotary to stationary stator can be accomplished electrically, in that said active unit is present twofold, namely, once connected firmly to the torque transmitter and permanently rotary, and once permanently restrained from rotating, but not connected to the torque transmitter. Depending on which of the two doubly present active units is electrically activated, the one or the other condition will be achieved according to the above remarks. If the stator is restrained from turning (or if the restrained part is electrically active) and the bridge coupling is closed, the electric machine will work like the machine described in the beginning, which sits on a continuous shaft in the power train and can accomplish the ASR function by brake action.

The invention is also addressed to a method of operating a drive system, especially for a motor vehicle, with a drive assembly, in particular, an internal combustion engine, an electric machine, and a drive slip control system, wherein a drive slip reduction is produced by means of the electric machine, in particular, by brake action and/or—when the electric machine is working as a clutch—by clutch slip action.

The method can be implemented advantageously with a system according to one or more of the above-explained configurations. As for individual features and advantages of the method, refer to the above explanations on the system, which also apply fully to the method in its different configurations.

Furthermore, in all of the present specification, numerical indications "x" shall be understood in the sense of "at least x," and only preferably in the sense of "exactly x."

In the figures, parts essentially identical in function bear the same references.

The control sequence of the ASR control system per FIG. 1 runs through steps S1–S6 in a quasi-endless loop.

In step S1, it polls whether the drive slip exceeds a first limit value L1. The drive slip value is determined, for example, from the magnitude of the time change in the rotary speed of the drive wheels, in reference to the vehicle's acceleration. If no, the control system returns to the starting point, whereupon step S1 is again carried out. If yes, an electric machine providing for the ASR intervention generates in step S2 a braking action on a torque-transmitting drive shaft. As an alternative—in the case of a machine which works as an electromagnetic coupling in the drive shaft—the machine is controlled such that it allows the clutch to slip. In step S3, the system polls whether the drive slip value has further increased. If no, the following step S4 is jumped over. If yes, in the following step S4, as an additional measure, those wheel brakes are activated which have drive slip. In step S5, the system polls whether the drive slip value has fallen below a second limit value L2. If no, the control sequence prior to step S5 returns, so that the steps instituted during S2 and possibly S4 are further maintained. If yes, in step S6 the brake action or coupling slip action of the electric machine is interrupted and the wheel brakes are released, if applicable. Next, step S1 is again run through and the control process is carried out all over again.

Figure 2:
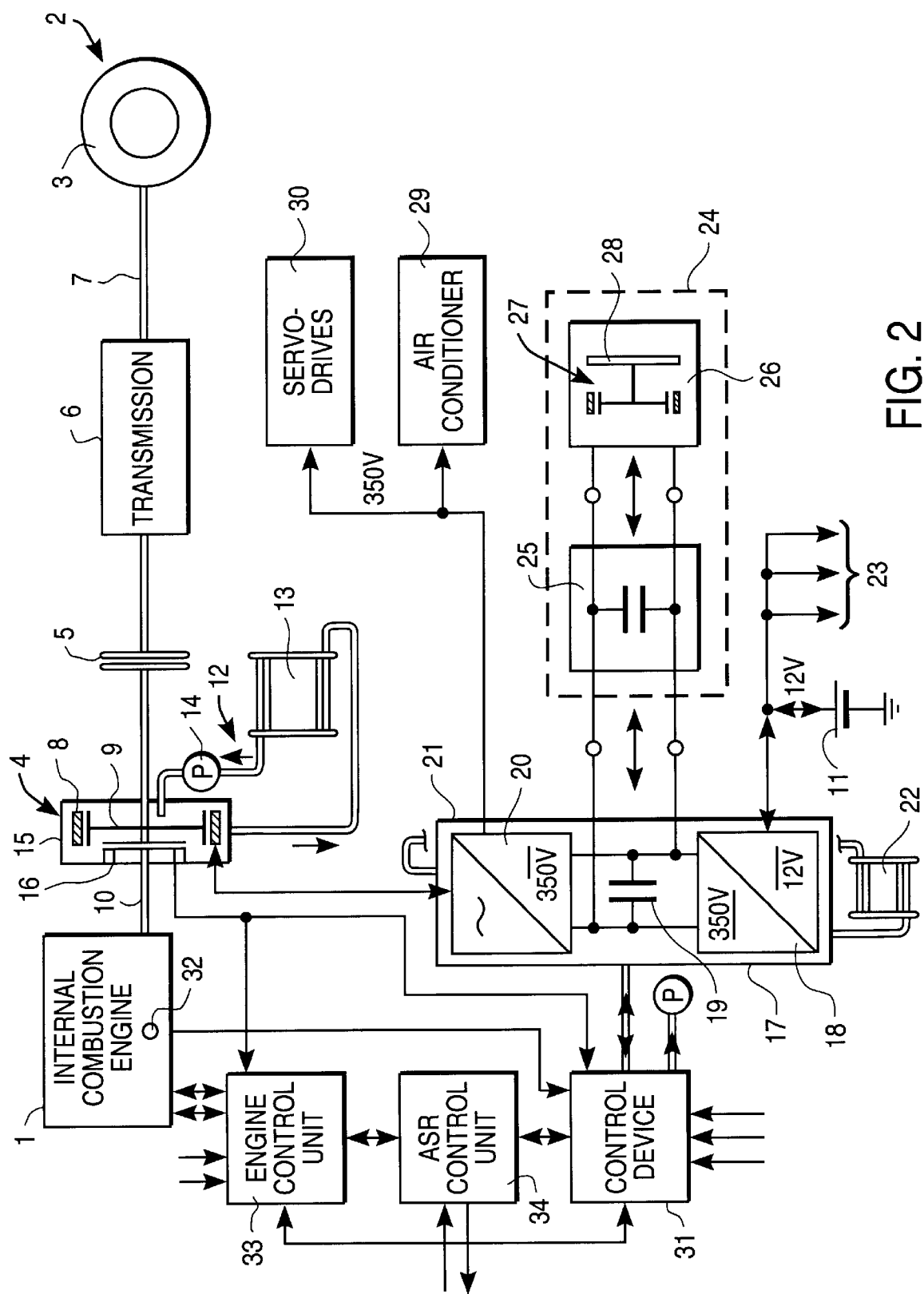
FIG. 2 a not-to-scale schematic representation of one embodiment of the system.

The drive system of a motor vehicle, such as a passenger car, represented in FIG. 2, has as its drive assembly an internal combustion engine 1, which can be a four-cylinder, four-stroke Otto or Diesel motor. The torque produced by the engine 1 can be transferred by a drive train 2 to drive wheels 3. In the takeoff direction, in the drive train 2, there first comes after the engine 1 an electric machine 4. This is followed by a travel coupling 5, a transmission 6, and an axle drive 7, which transfers the torque to the drive wheels 3. The coupling 5 and the transmission 6 can be a frictional clutch and a gearbox; alternatively, for example, an automatic coupling or transducer coupling are possible, each with gearbox or automatic transmission. In other embodiments (not shown), an additional coupling (activated by a control system) is arranged in the drive train 2 between engine 1 and electric machine 4, in order to prevent the engine 1 from following along when braking with the electric machine 4.

The electric machine 4—here, a rotary-current traveling-wave machine in induction or synchronous design—comprises a stator 8 and a rotor 9. The former is stationary and thrusts against the internal combustion engine 1, the vehicle chassis (not shown), or a coupling housing (not shown), whereas the latter sits directly on a drive shaft (crankshaft) 10 of the engine 1 or an extension thereof and is firmly coupled to it. The drive shaft 10 and the rotor 9 thus rotate together, without a gearing coming in between.

The electric machine 4 fulfills several functions: it functions as a brake device in the context of an ASR control system, as has already been explained in connection with FIG. 1. On the other hand, it functions as a generator to charge the vehicle's battery 11 and to supply electrical consumers and thereby replaces a dynamo normally present in the motor vehicle. Furthermore, the generator function can serve to brake the vehicle or the engine 1. In addition, the electric machine 4 can function as an additional motor ("booster"), e.g., to support the engine when accelerating the vehicle. It also serves as a starter for the internal combustion engine and thus can also replace a separate starter normally provided in the motor vehicle. It also serves as a reducer of rotational nonuniformity. Finally, by virtue of the moment of inertia of the rotor 9, it functions as a flywheel and can thus replace the flywheel generally present on the crankshaft in traditional motor vehicles.

The electric machine 4 is cooled on the inside by a spray fluid cooling 12. After going through a cooler 13 and a pump 14, the cooling fluid—here, a suitable oil—is sprayed onto the rotor 9, and this in proximity to its axis of rotation. Because of the rotation of the rotor and centrifugal force, it travels outwardly, thereby cooling rotor 9 and stator 8, and then exits a housing 15 of the electric machine 4, again returning to the cooler 13 in a closed circuit. Depending on the loss power and rotary speed, the flow of coolant is provided by corresponding control of the pump 14, so that each time only just the required minimum of cooling fluid is present inside the housing 15. An equalization vessel (not shown) allows this variation in the amount of coolant in the housing 15. In other configurations (not shown), the electric machine (or only the rotor) is integrated in a coupling and/or transmission housing and cooled by a lubricating and/or cooling fluid (e.g., clutch or transmission oil) located therein.

Furthermore, the electric machine 4 is outfitted with a rotation transformer 16 (so-called resolver), which preferably has more than eight poles, here, for example, 12 poles. It consists of two adjacent circuit boards, one of which is stationary and the other turns with the drive shaft 10. The circuit boards have windings formed by conductor tracks on their facing surfaces, such that a transformer translation ratio dependent on angle of rotation results. The rotation transformer 16 operates on the transponder principle: The stationary windings (stationary board) are actively loaded with current/voltage and give off electromagnetic energy to the rotating windings (rotating board). The latter radiates a portion of this energy back again, and this portion depends on the angle of rotation, given the angle-dependent transmission ratio. The back-radiated portion generates in the stationary windings a signal dependent on angle of rotation. Evaluation of this signal provides the instantaneous angle of rotation of the drive shaft 10 with a precision of at least 0.5 degrees. In more simple configurations, an incremental pickup is used, or there is no such pickup at all.

An invertor 17 provides the stator 8 of the electric machine 4, at a very high clock frequency (e.g., 100 kHz), with sine-reinforced pulse width modulated voltage pulses, which under the action of the machine's inductance basically yield sinusoidal three-phase currents, whose amplitude, frequency and phase are freely selectable.

The invertor 17 is a voltage intermediate-circuit pulse invertor and comprises three subassemblies: a dc voltage converter 18 (input assembly), which converts dc voltage from a low level (here, 12 V) to a higher intermediate circuit level (here, 60 V or 350 V) or back again, an electrical intermediate circuit accumulator 19, here, a capacitor or an arrangement of parallel-switched capacitors, and a machine invertor 21 (output assembly), which can generate from the intermediate circuit dc voltage the (synchronized) three-phase alternating voltage of variable amplitude, frequency and phase or—when the electric machine 4 is operating as a generator—can convert any such alternating voltages into the intermediate-circuit dc voltage. In other configurations (not shown), the intermediate circuit level lies at the upper edge of the low-voltage range that is permitted without special electrocution protection, here, 60 V.

The three subassemblies 18, 19, 20 of the invertor 17 are hermetically enclosed in a metal housing 21, which is filled with a suitable boiling type coolant. This is, for example, a fluorohydrocarbon, having a suitable boiling point, e.g., 60° C., at a suitable pressure (say, between 50 mbar and 3 bar). Evaporated coolant can condense in a condensation cooler 22 and return to the housing 21 in liquid form in a closed circuit. The housing 21 with the cooling circuit is hermetically tight.

The dc voltage converter 18 is connected, at the low-voltage side, with the vehicle's battery 11 and various low-voltage consumers 23, such as lighting and electronic devices. The invertor 17, on the one hand, can furnish current at low voltage level for charging the vehicle's battery 11 and supplying the low-voltage consumers 23, and on the other hand it can take current from the vehicle's battery 11 at low voltage level for starting the internal combustion engine 1. In other configurations (not shown), the vehicle's battery is at intermediate circuit level and coupled directly to the intermediate circuit.

The intermediate circuit accumulator 19 is connected to an external additional accumulator 24, which can be an electrical accumulator, here, an extra capacitance 25, and/or a flywheel accumulator 26. The additional accumulator 24 has the primary task of buffering the energy obtained from the rotational nonuniformity reducer in a brake phase and surrendering it again for the following drive phase. In addition, it can also serve to save that energy which accrues during other brake processes mediated by the electric machine 4 (ASR braking, among others). Finally, it can take strain off the vehicle's battery 11 when starting the engine 1, since it takes energy only slowly from the battery and saves it in the additional accumulator 24. Here, it is then available for fast removal during the starting process.

On the other hand, the (inner) intermediate circuit accumulator 19 has the basic task of providing voltage with the necessary steep rise time for clock purposes—i.e., quickly—to the machine-invertor group. It does not need any very high capacitance for this (e.g., it has 2 μF), and in fact low lead inductances are more advantageous for speed purposes, which is ensured by the arrangement in the interior of the invertor 17 (and preferably on the same board on which the electronic switches of the machine-invertor 20 are also arranged). The additional accumulator 24, on the other hand, can work relatively slowly, so that the lead capacitances here are not a problem, due to the external arrangement. In particular, the additional capacitance 25 can be 50–10,000 times greater than that of the intermediate circuit accumulator 19 (here, it is 4.7 mF, for example, for furnishing the rotational nonuniformity energy).

Even larger storage capacities can be achieved with the flywheel accumulator 26, which here comprises its own invertor-controlled electric machine 27 and a gyrating mass 28 coupled to it. The latter can be formed by a separate flywheel or be integrated in the rotor of the electric machine 27. The moment of inertia of the gyrating mass 28 is preferably 0.05 to 2 kgm$^2$. It is also possible to store a multiple of the energy needed to start the engine 1 in the flywheel accumulator 26 and quickly remove the particular energy needed for starting from it (i.e., in less than 1 second).

In other configurations (not shown), no separate additional accumulator 24 is provided. Here, the intermediate circuit accumulator 19 is dimensioned and possibly arranged outside the invertor 17 so that it can take on the function of the additional accumulator 24.

The intermediate circuit with its high voltage level (here, 60 V or 350 V) supplies various high-power consumers, such as an air conditioner 29 and servo-drives 30 with electrical energy. Whereas such high-power consumers are traditionally operated by mechanical coupling from the internal combustion engine 1, the high-voltage level available here allows a more efficient, purely electrical powering.

A control device 31, through appropriate actuation of its semiconductor switches, instructs the invertor 17 at each moment of time as to the amplitude, frequency, and phase that the alternating voltage generated by it should have. The control device 31, which can be formed, for example, by a correspondingly programmed microcomputer system, first determines the magnitude and the direction of the torque which the electric machine 4 is supposed to produce at a particular time. It does this on the basis of ASR information, which it obtains from an ASR control unit 34. For the auxiliary function [of] reduction of rotational nonuniformity [sentence incomplete in original]. It can do this, e.g., by means of a characteristic diagram control system, in that it obtains, as input information from the rotation transformer 16, the angular position of the drive shaft 10, the mean rotary speed at the moment, and possible other operating parameters, such as the throttle valve position, and it determines from a memorized characteristic diagram the rotational nonuniformity to be expected at the moment, as a function of these operating parameters. Another possibility is to determine the rotational nonuniformity actually existing at the time, for example, by computing the instantaneous rotational velocity on the basis of information furnished by the rotation transformer 16 and/or by evaluating the gas pressures existing in the engine 1 at the time, which can be detected by means of gas pressure sensors 32, and also by picking up the instantaneous torque of the engine 1 by means of a torque hub (not shown) in the drive train. From the value thus determined for the instantaneous rotational nonuniformity, a corresponding (opposite-phase) value is derived for the rapidly changing nominal torque of the electric machine 4, onto which may be additively superimposed a positive or negative constant torque of desired strength. To start the internal combustion engine 1, the nominal torque can be determined on the basis of memorized values, which specify the nominal time curve of the rotary speed or torque of the electric machine 4 during the starting process, perhaps supplemented by a measurement of these quantities and a feedback control, which ensures that the preset values are maintained.

In a second step, the control device 31 determines which amplitude, frequency, and phase of the voltage or current must be provided by the invertor 17 in order for the electric machine 4 to produce this nominal overall torque. This determination is done, in electrical induction machines, on the basis of a field-oriented automatic control, which is based on a model computation for the electric machine 4 and which uses as input information essentially the measurable electrical quantities of the stator (amplitude, frequency and phase of current and voltage) and the instantaneous mean speed of the rotor.

In FIG. 2, the control device 31 is shown as being arranged outside the invertor housing 21. In order to keep the lead inductances low and also participate in the boiling bath cooling, however, it is arranged inside the invertor housing 21 in other configurations (not shown).

The control device 31 shares various sensors serving to carry out its control tasks and sensor information derived from them with an motor control unit 33 to control the engine 1. Specifically, these are, for example, the rotation transformer 16 (angle position pickup), the gas pressure sensors 32, as well as sensors (not shown) for detecting the mean rotary speed, the loading condition of the engine 1 (e.g., through the throttle valve position) and its torque (e.g., through a torque hub).

Furthermore, the control device 31 communicates with a number of other control units: the ASR (drive slip control) control unit 34 tells the control device 31, when drive slip is present, that the electric machine 4 should temporarily act as a generator brake, if necessary before the ASR control unit institutes a braking of the particular drive wheels by the wheel brakes as a more massive remedy if the drive slip continues. In addition, the ASR control unit can relay its slip information to the motor control unit 33, to bring about a further reduction in the engine torque. An energy consumption control unit (not shown) indicates how much energy is needed for charging the vehicle battery 11, for supplying the low-voltage consumers 23 and the high-power consumers 29, 30, so that the control device 31 can provide for a corresponding overall thrust adjustment • Me (see FIG. 1c). The motor control unit 33 tells the control device 31 whether the electric machine 4 is supposed to provide acceleration or braking of the vehicle in addition to its vibration diminishing function, so that it can provide a corresponding overall thrust shift • Me and perhaps temporarily switch off the rotational nonuniformity reduction function. The motor control unit 33 can also implement an automatic start-stop control and tell the control device 31 whether the electric machine 4 should start the engine 1. In other configurations (not shown), the ASR control is taken over by the motor control unit 33 or by the control device 31. A separate ASR control unit is then unnecessary.

Energy obtained during each type of braking is kept in the additional accumulator 24, to be re-used for subsequent powering of the electric machine 4 or diverted to the vehicle battery 11.

Figure 3A:
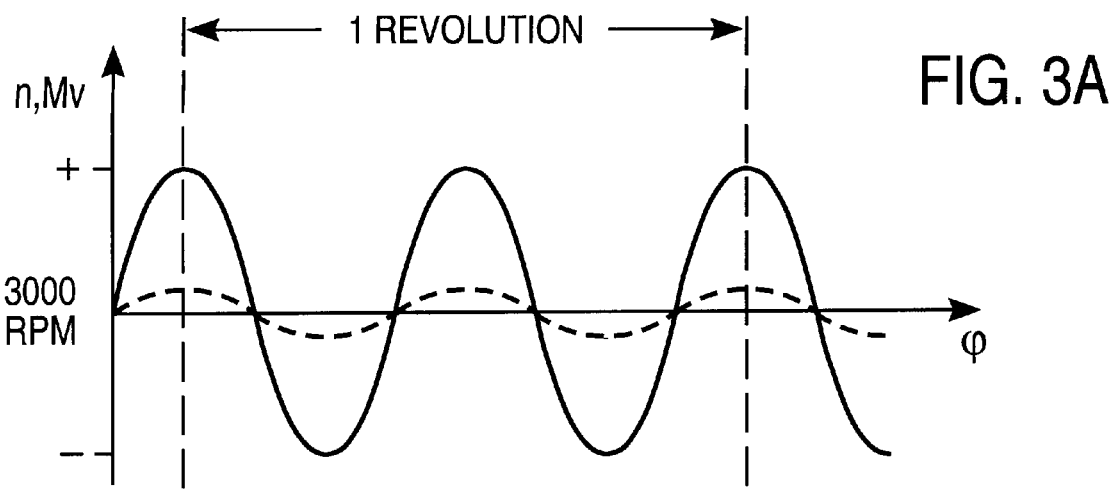
FIG. 3 a schematic sample representation of the functioning of the system for active reduction of rotational nonuniformities.

FIG. 3a shows the active reduction of rotational nonuniformity. The solid line shows the rotary speed n of the drive shaft 10 as a function of the crankshaft angle__. The shaft periodically executes speed fluctuations toward smaller and larger speeds about a mean speed (here, 3000 revolutions per minute), which in this idealized example have a basically sinusoidal appearance. The shaft is, for example, the crankshaft of a four-cylinder, four-stroke internal combustion engine of a motor vehicle, having in the second order (i.e., at a frequency of 100 Hz) a relatively large rotational nonuniformity resulting from the gas and mass forces. As an illustration, the angle interval needed for one revolution of the shaft is also indicated. In general, rotational nonuniformities of higher orders and those of stochastic nature also occur on a shaft (not shown here). Thus, their appearance is generally not sinusoidal.

There are fluctuations in the torque Mv of the engine about a mean torque, basically proportional to the rotational nonuniformities. The solid line in FIG. 1a also illustrates the curve of the engine torque Mv as a function of the crankshaft angle_.

Figure 3B:
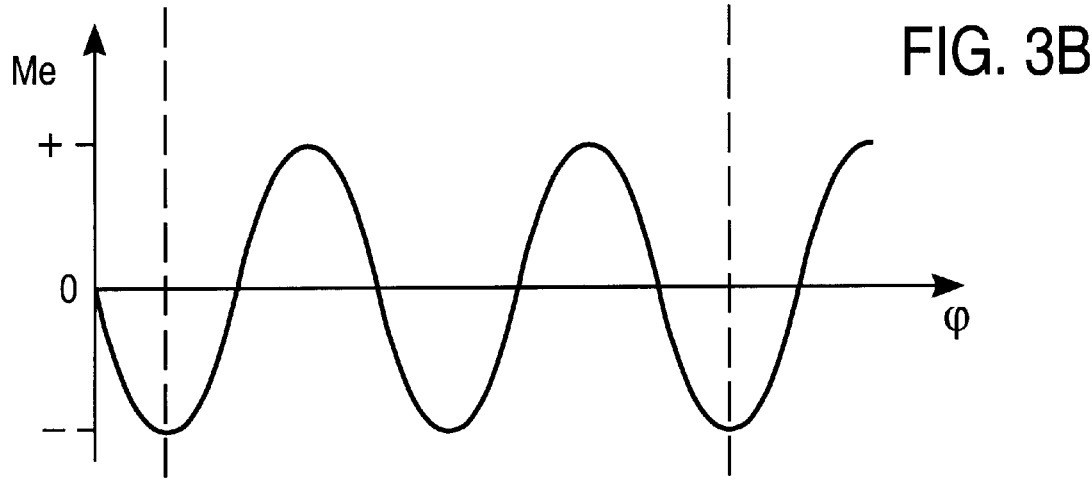

FIG. 3b shows the total torque Me as a function of the shaft angle_, which is applied by an electric machine coupled to the shaft. The curve of the machine torque Me largely corresponds to that of the rotational nonuniformity and the engine torque Mv, but is opposite in direction. That is, when there is a rotational nonuniformity toward higher speed (so-called positive nonuniformity), the electric machine generates a torque to brake the shaft (so-called negative torque), whereas in the case of a rotational non-uniformity toward lower speed (so-called negative nonuniformity) it generates a driving torque (so-called positive torque). The magnitude of the torque Me is chosen such that the rotational nonuniformity—and the fluctuation of the torque Mv proportional to it—is substantially reduced or even virtually disappears through its action, as is illustrated in FIG. 1a by the broken line.

In the mode of operation shown in FIG. 3b, the negative and positive torque extrema are equal in magnitude. Thus, the energy obtained during a braking phase is essentially equal to the energy used up in the following drive phase. Therefore, the outward energy flux is zero, and brake energy is only buffered temporarily inside the system. Thus, the system in this operating mode works like a pure rotational nonuniformity reducer with rapidly varying torque, without generating a constant torque.

Figure 3C:
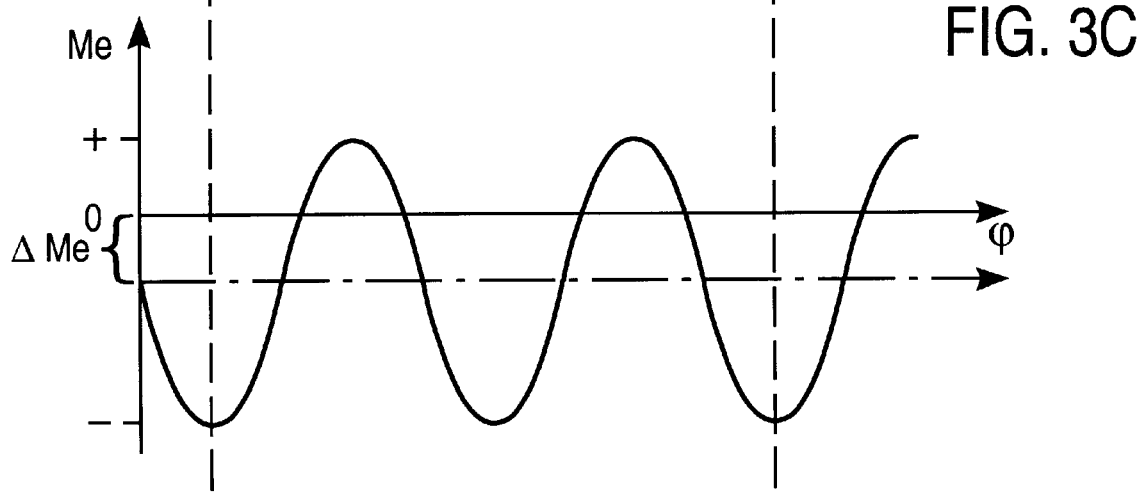

An example of an operating mode of the system modified from the preceding one, with a constant torque, is shown in FIG. 3c: The time course of the total torque Me corresponds to that of FIG. 1b, but it is shifted overall by a particular amount ΔMe (the so-called deviation) in the negative direction. The deviation ΔMe will generally vary slowly, but in the brief time frame represented here of approximately one period of rotation it is constant to a good approximation. The deviation ΔMe here is smaller than the amplitude of the rapid variation of the torque, so that the overall torque ΔMe alternately takes on positive and negative values. Averaged over the rapid torque variation, one obtains a constant torque ΔMe. Thus, on average, mechanical energy is withdrawn from the internal combustion engine, being largely transformed into electrical energy and taken out of the system. The electrical machine in this type of operation thus has the function of an electrical generator, besides the function of a rotational nonuniformity reducer, which can act as a brake and deliver current, e.g., to counterbalance operating losses of the system, to charge the vehicle's battery, and/or to operate electrical consumers.

If the deviation ΔMe is greater than the amplitude for reducing the rotational nonuniformity, the electric machine will only work as a brake and no longer as a drive, and the braking action will vary in magnitude according to FIG. 1b and 1c, in opposite phase to the rotational nonuniformity.

Both small and very large generator powers can be adjusted simply by an appropriate adjustment of the (software) control system of the electric machine—without any structural (hardware) changes. Only the size of the electric machine is a limitation. Thus, the very same machine type can be used, for example, for small and large vehicle types without design adaptation.

The overall torque curve can also be shifted in the positive direction (positive deviation). The electric machine then works as a (driving) motor, besides its function as a rotational nonuniformity reducer, to support the engine when accelerating the vehicle, for example.

Figure 4:
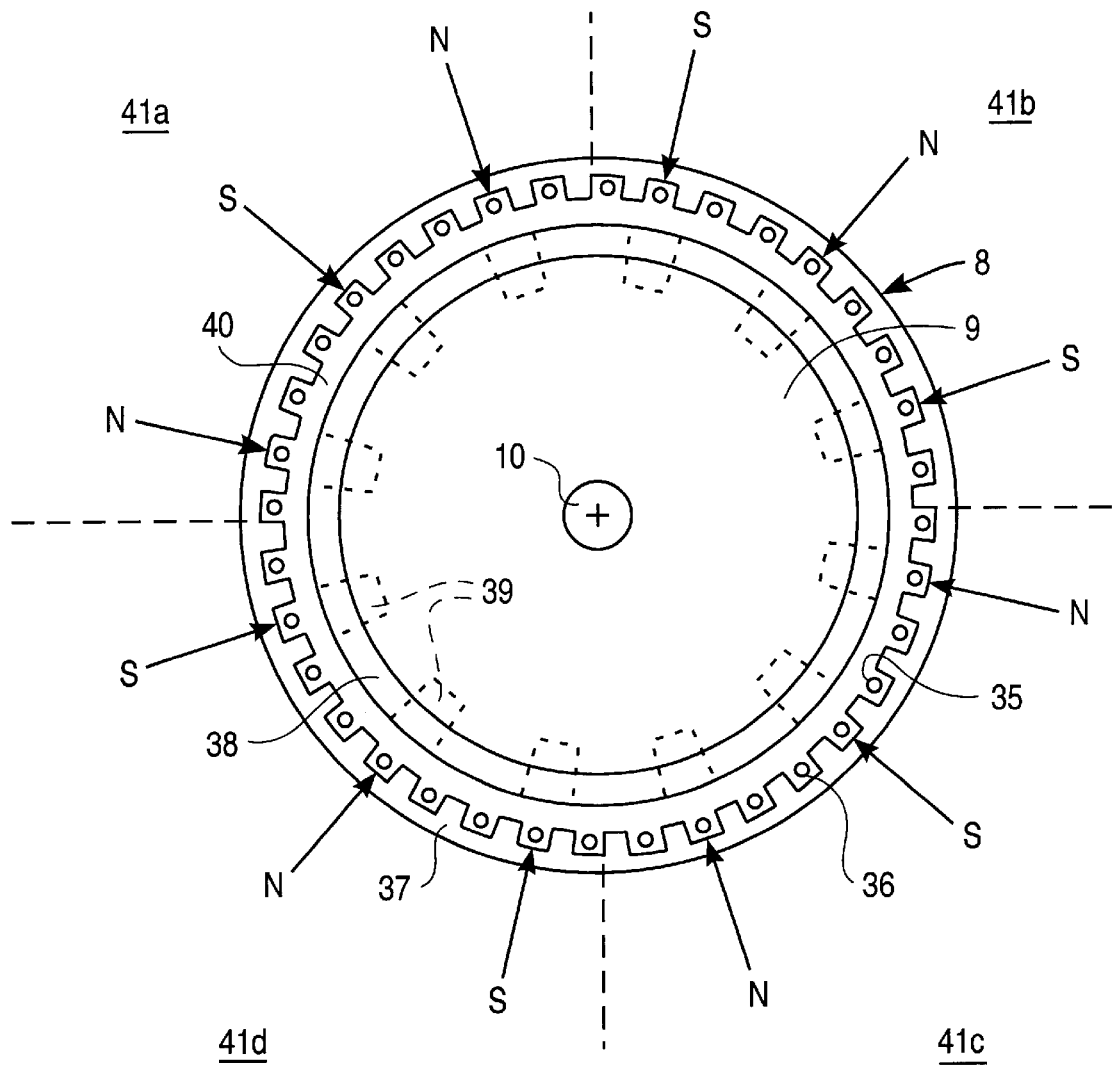
FIG. 4 a schematic cross sectional representation of an electric machine with plane of sectioning perpendicular to the axial direction in order to illustrate various machine types which can be used in the system.

The electric machine 4, shown more closely in FIG. 4, has no brushes or wiper and is thus free of wear. It has an outer diameter of around 250 mm and a length in axial direction of 55 mm and produces a continuous torque of around 50 Nm and a peak torque of around 150 Nm with a weight of 10–15 kg. It can attain rotary speeds corresponding to the peak speed of conventional internal combustion engines (around 6000 to 10,000 rpm) and is speed-resistant up to 14,000 rpm. The electric machine 4 has an exterior stator 8, having grooves 35 in the direction of the drive shaft 10 (axial direction). The stator 8 carries a three-phase winding 36, configured such as to form 12 poles when energized with three-phase current. There are three grooves 35 per pole, and thus a total of thirty-six grooves 35. (In other configurations (not shown), at least six grooves per pole, preferably nine grooves, are present in order to reduce stray effects.) The poles revolve in circular motion in the stator 8 with the rotary-current oscillation. Their momentary position at a particular time is shown by arrows carrying the designations "S" (for south pole) and "N" (for north pole). A back 37 closing off the grooves 35 on the outside is relatively thin in radial direction, its thickness being preferably 3–25 mm (at the location of a groove 35). The stator 8 is constructed from thin plates (the thickness here is 0.25 mm) of a material with low remagnetization losses (here, less than 1 W/kg at 50 Hz and one Tesla), with the planes of the plates being perpendicular to the axial direction.

The interior rotor 9 in the case of the induction machine is fashioned as a squirrel-cage rotor with cage bars traveling essentially in the axial direction, each of them being joined at the end face to a short-circuit ring 38. In the case of the synchronous machine, the rotor 9 carries a corresponding number of poles to the stator 8 (here, 12 poles), which can be formed by permanent magnets or appropriately excited coils. FIG. 3 also shows the synchronous machine, schematically indicating its rotor poles (reference number 39).

The air gap 40 between rotor 9 and stator 8 is relatively large; its width is 0.25 to 2.5 mm, preferably 0.5 to 1.5 mm.

In other configurations (not shown), the rotor is exterior and the stator is interior.

Figure 5:
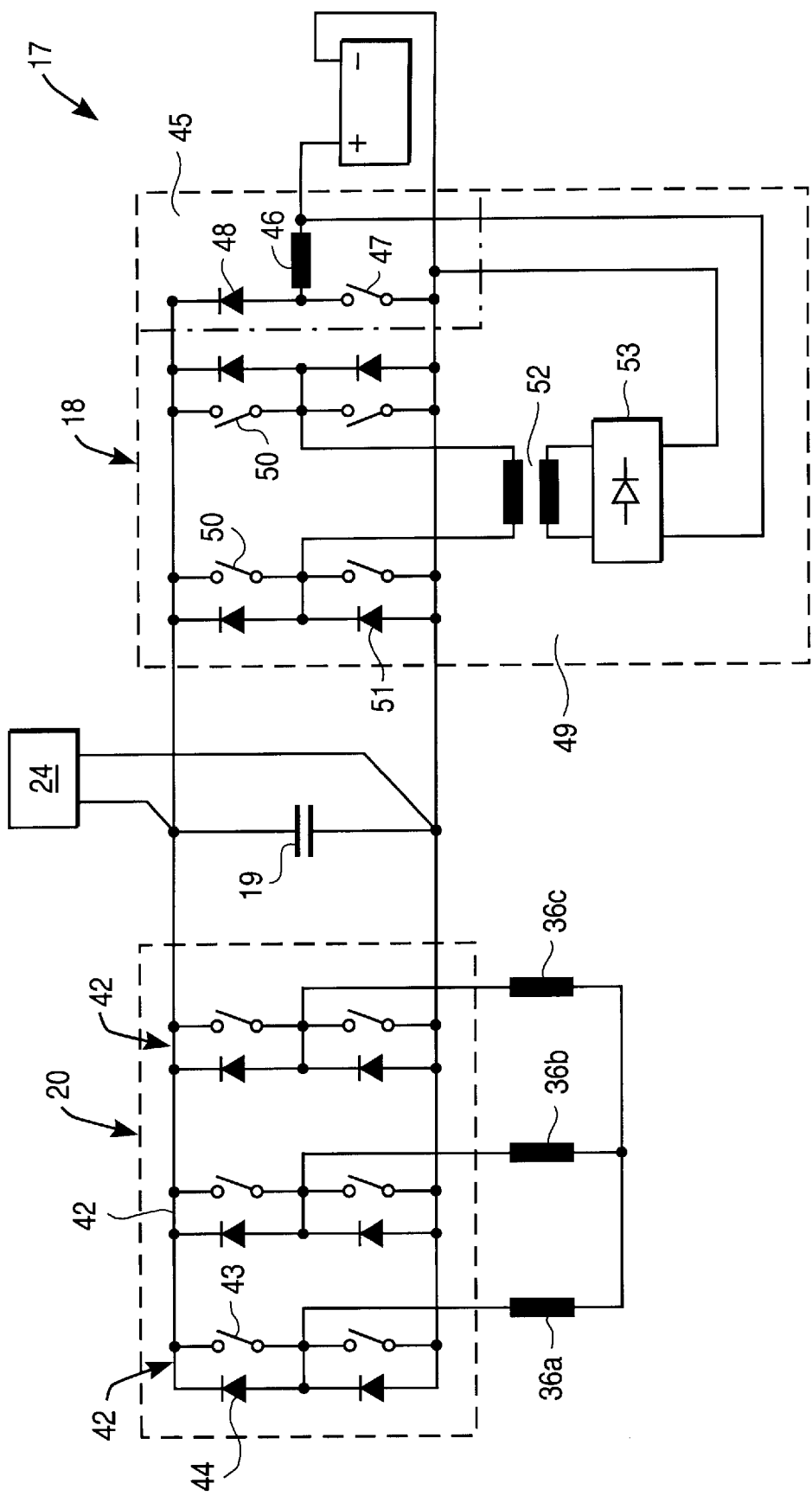
FIG. 5 a schematic circuit diagram of an invertor used in the system.

FIG. 5 shows a schematic diagram of the invertor 17. One recognizes the intermediate circuit accumulator 19 in the form of a capacitor, which is switched in parallel to the additional accumulator 24 (not shown more closely here). The capacitor symbolizes a parallel connection of several capacitors.

The machine invertor 20 is formed by three parallel-connected (but independently engaging) switch groups 42, each of the switch groups 42 being responsible for generating one of the three 3-phase voltages. Each of the switch groups 42 is a series connection of two (independently switching) switches 43 between the plus and the minus pole of the intermediate circuit. The series connection is joined at the center (i.e., between the switches 43) by one side to one of the three windings 36*a*, 36*b*, 36*c* of the three-phase winding 36; at the other side, the three windings 36*a*, 36*b*, 36*c* are joined together.

A free-wheeling diode 44 is connected in parallel to each of the switches 43. It is polarized such that it normally blocks and only when the opposite switch is open does it let through a brief current flow in the other direction, generated by self-inductance.

Each switch 43 symbolizes a parallel connection of several (e.g., five) MOS field-effect transistors, which are directly actuated by the control device 31 to form a three-phase current of desired amplitude, frequency and phase.

The dc voltage converter 18 comprises two subassemblies, namely, one which can bring electrical energy from the low voltage level (12 V) up to the high intermediate-circuit voltage level (60 V or 350 V), and another which can bring electrical energy from the high voltage level (60 V or 350 V) to the low voltage level (12 V). The first-mentioned subassembly can be absent from configurations with vehicle battery arranged in the intermediate circuit.

The first subassembly is, for example, a step-up transformer 45. This is formed by a series circuit of an inductance 46, connected to the plus pole of the vehicle's battery 11, and a switch 47 connected to its minus pole and the minus pole of the intermediate circuit, this series circuit being connected in the middle to the plus pole of the intermediate circuit via a step-up diode 48 (polarized in the conducting direction). When the switch 47 is closed, a circular current flows from the plus to the minus pole of the vehicle battery 11. After opening the switch 47, a self-inductance voltage tries to prevent a collapse of this current, with the result that the high intermediate-circuit voltage level (60 V or 350 V) is temporarily exceeded and current flows through the (otherwise blocking) step-up diode 48 and charges the intermediate-circuit accumulator 19. By periodically opening and closing the switch 47, one achieves a quasistationary charging current, e.g., in preparation of the starting process. The switch 47 is a semiconductor switch, which is directly actuated by the control device 31.

The second subassembly is a step-down voltage transformer 49, for example, which functions similar to a switching power pack. It comprises two series circuits of switches 50 between the plus and minus pole of the intermediate circuit, each of them with parallel-connected free-wheeling diodes 51. The ends of a primary winding of a high-frequency (HF) transformer 52 are each connected to the middle of these series circuits. The secondary winding of the HF transformer 52 energizes a rectifying and smoothing unit 53, which in turn energizes the vehicle battery 11 and possibly low-voltage consumers 23. The switches 50 symbolize semiconductor switches, which are directly actuated by the control device 31. By periodically opening and closing the switches, a high-frequency alternating current can be generated, which induces in the secondary winding of the HF transformer 52 a corresponding alternating voltage at lower voltage level, which is rectified and smoothed out by the unit 53. The exact value of the resulting dc voltage can be precisely adjusted by means of the switch 50, through varying the switching frequency.

In other configurations (not shown), a motor control unit—derived from a conventional motor management system—takes on the functions of the control device 31, which can then be dispensed with.

Figure 6:
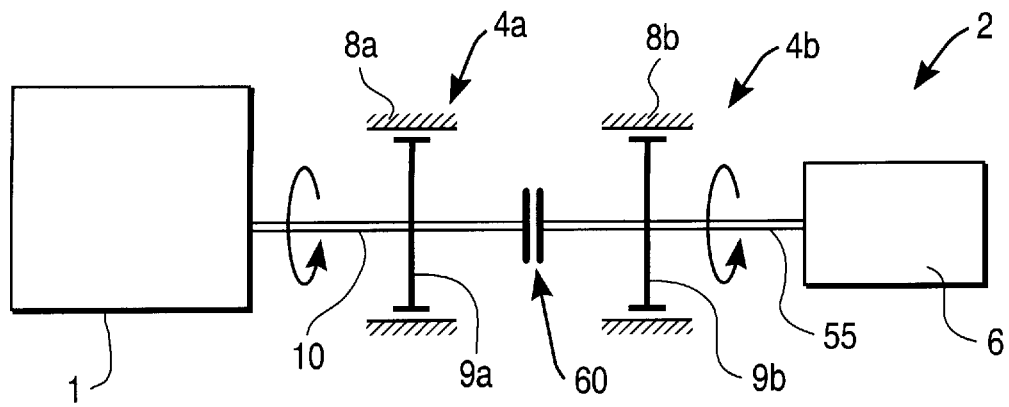
FIG. 6 a schematic representation of a dual electric machine.

A dual electric machine 4, per FIG. 6, which can also provide the function of an electromagnetic coupling and/or a synchronizing device for a following transmission, sits in the drive train 2 between the drive shaft, e.g., the drive shaft 10 of an internal combustion engine 1, and the takeoff shaft, e.g., the transmission shaft 55 coupled to a transmission 6. It comprises two electric machines 4*a*, 4*b*, each with a nonrotating stator 8*a*, 8*b* and each with a rotor 9*a*, 9*b*, rotating with the drive shaft and takeoff shaft, respectively. The rotors 9*a*, 9*b*—and, thus, the drive shaft and takeoff shaft—can be firmly mechanically joined together—by means of a mechanical bridge coupling 60—here, a positive-locking or friction-locking coupling. Preferably, this can be actuated in controlled manner, e.g., mechanically, electrically, hydraulically or pneumatically. In other embodiments, the bridge coupling 60 is not present.

Figure 7:
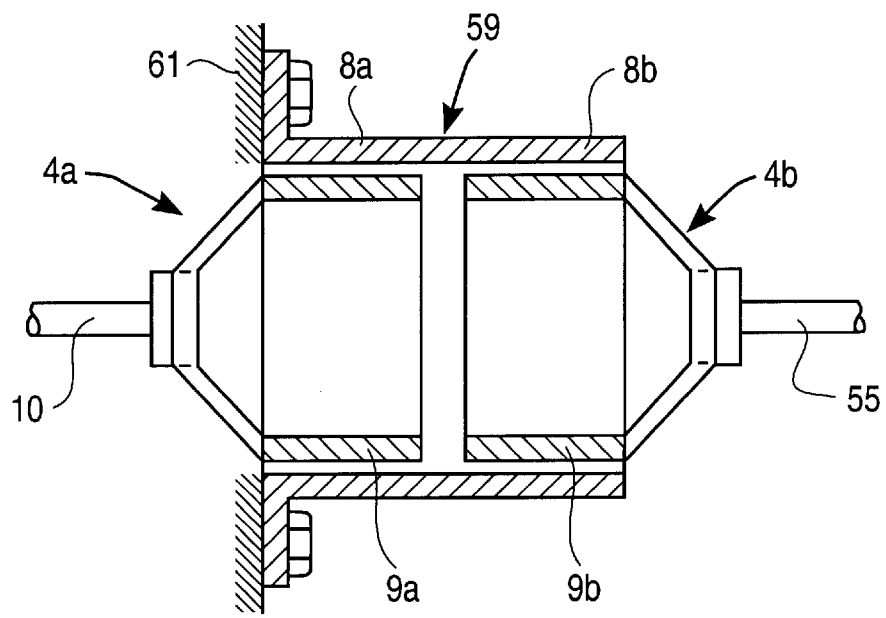
FIG. 7 a representation of a dual machine per FIG. 1 with joint stator body.

FIG. 7 shows a dual machine 4 corresponding to FIG. 6, in which the rotors 9*a*, 9*b* are arranged in a common stator body 59 in coaxial manner, which accommodates the two (electrically separated or separable) stators 8*a*, 8*b* and is firmly secured, e.g., to a crankcase 61 of the engine 1. The bridge coupling (not shown here) can be implemented, for example, in that the rotors 9*a*, 9*b* can be brought into positive or friction locking with each other by axial shifting. As an alternative, it can be formed, e.g., by a friction or claw coupling, integrated in the rotors 9*a*, 9*b*.

In the dual machine 4 of FIG. 6 and 7, the ASR intervention occurs in that the machine 4*b* at the takeoff end generates less driving torque when drive slip is present. This corresponds to a clutch slip.

Figure 8:
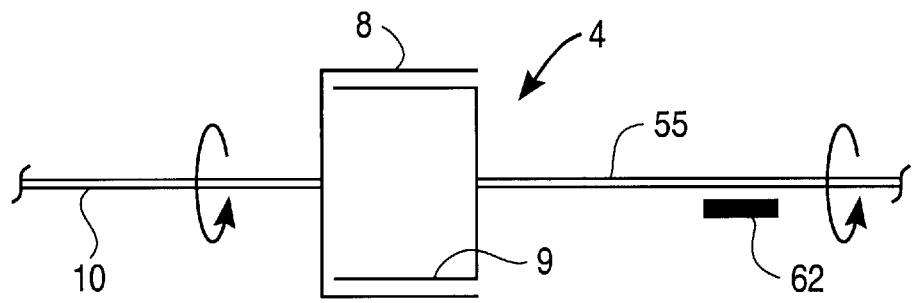
FIG. 8 a schematic representation of an electric machine with electromagnetic operating units that can rotate.

A single electric machine 4 per FIG. 8, which has the function of an electromagnetic coupling and/or synchronizing device, has an inner and an outer electromagnetic active element, which are termed here the rotor 9 and the stator 8', borrowing the conventional terminology from electrical machines. The rotor 9 is firmly joined to the takeoff shaft 55 and the stator 8' is firmly joined to the drive shaft 10 (in other configurations—not shown—this arrangement is reversed). The electric machine 4 can thus rotate as a whole in addition to the rotor's rotation; the term "stator" should thus be taken only in a transferred sense, seeing that it can rotate. Whereas in a stationary electrical machine—such as a rotary-field machine—it is possible to restrict the current supply to the stationary active element (i.e., the stator) and to produce currents in the rotating active element (i.e., the rotor) without supplying current, by induction alone, in the present case—where both active elements can rotate—current is supplied to at least one of them (here, the stator 8') across rotation-movable electrical connections (e.g., across wiper/slip ring contacts, not shown here). The takeoff shaft 55 can be prevented from turning with a mechanical clutch, here, a brake 62 which is thrust against the vehicle chassis or the transmission housing. The configuration shown has no bridge coupling, but other configurations (not shown) are outfitted with a frictional or nonpositive-locking bridge coupling for the mechanical connection of the shafts 10, 55. The machine 4 can be placed in or on the engine housing, transmission housing, or at any other place in the drive train 2.

In the single electric machine 4, the ASR intervention involves allowing the clutch to slip when drive slip is present. If the drive wheel slip is too great, the clutch slip is momentarily increased and, thus, the torque applied to the drive wheels is reduced. If a bridge coupling is present, this is previously disengaged.

In the function as shift coupling and possibly as starting coupling, a synchronism of the shafts 10, 55 is achieved by such an adjustment of the torque-generating magnetic fields of the machine 4 that a uniform rotary speed prevails between the shafts 10, 55, i.e., the coupling slip between stator 8' and rotor 9 precisely vanishes. In an induction machine, this is accomplished, for example, by automatic control or open-loop control of the magnetic slip of a rotary field of suitable frequency and amplitude, turning opposite the direction of the drive torque. A positive-locking bridge coupling (not shown here) eliminates the electromagnetic losses during vanishing coupling slip.

The active transmission synchronization serves to accelerate or brake the takeoff shaft 55 during a gear shift such that the gears being meshed together have the same peripheral velocities. This function can be implemented in configurations of the single machine 4 even without coupling function—it is accomplished here by thrusting against the drive shaft 10 turning at the variable speed of the internal combustion engine 1. The contribution of this rotation is taken into account when determining and controlling the relative speed of the machine 4 necessary to the particular synchronization.

A reduction of rotational nonuniformities of the drive shaft 10 can occur with the vehicle at standstill, thrusting against the rotor 9 which is then prevented from turning by means of the brake 62. When moving under power, rotational nonuniformities of the takeoff shaft 55 can be reduced by rapid variation of the transmitted torque with the bridge coupling not engaged (or not present), specifically, by reducing [this torque] (i.e., increasing the clutch slip) for positive rotational nonuniformity and increasing [this torque] (i.e., decreasing the clutch slip) for negative nonuniformity. Additional acceleration or braking is possible with the bridge clutch not engaged by generating appropriate torques—or in other words—less or more clutch slip. A generator function to produce current is achieved by permanently maintaining clutch slip.

The electric machine 4 can start the internal combustion engine 1 directly, by thrusting against the takeoff shaft 55 fixed by the brake 62. In another configuration, when the machine 4 does not provide sufficient torque for this, it can serve as a nonwearing flywheel starter, making use of the electromagnetic coupling function. For this, the electric machine 4 first accelerates, with gear disengaged and brake 62 released, the then free-wheeling rotor 9, along with the takeoff shaft 55, propped against the drive shaft 10 and the compression of the still idle engine 1, up to a relatively high rotational speed, e.g., 2000 rpm. The electric machine 4 is then reversed in a brief time, such that it produces a braking moment, i.e., frictional connection between the rotor 9 and the stator 8'. In this way, the rotor 9 with the takeoff shaft 55 and the stator 8' with the drive shaft 10 are quickly brought to a common mean speed (e.g., 800 rpm) and the engine 1 is started.

Figure 9:
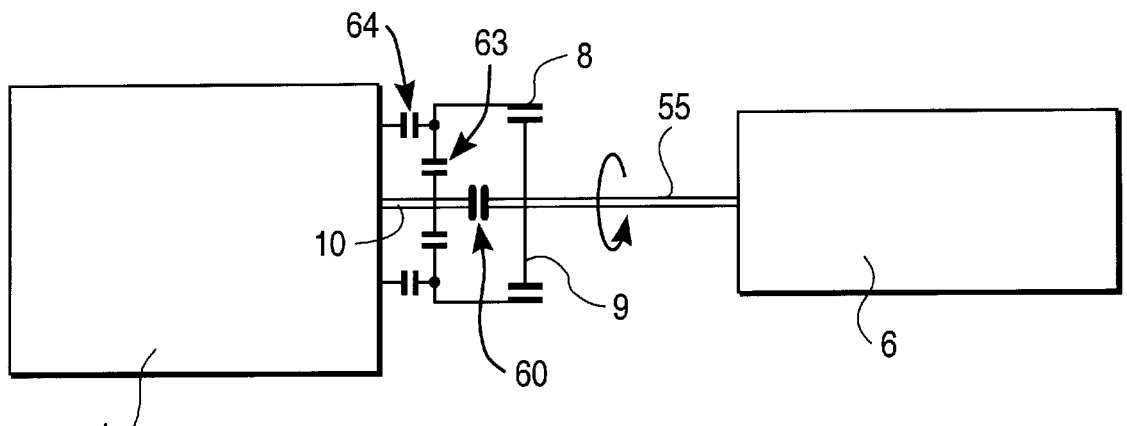
FIG. 9 a schematic representation of another electric machine with electromagnetic operating units that can rotate.

FIG. 9 shows a further modification of the electric machine with rotating active units per FIG. 8. Here, the stator 8' is not permanently coupled to the drive shaft 10, but rather can adopt three different coupling states in controllable manner:

1. coupled to the drive shaft 10 (as in FIG. 12);
2. freely rotatable without coupling to the drive shaft 10;
3. secured against rotation.

Two additional mechanical couplings, which can be friction-locking, but preferably also positive-locking couplings, are used for this: an engine coupling 63, which in the closed state couples the stator 8' to the drive shaft 10 (coupling condition 1), and a stop coupling 64, which in the closed state stops it from turning, e.g., by coupling to the crankcase 61 (coupling condition 3). For coupling condition 2, both of them are opened; a simultaneous closing is a forbidden state. The couplings 63, 64 (which are drawn double in FIG. 4 only for reasons of rotational symmetry), as well as the bridge coupling 60, can be activated in controlled manner, e.g., mechanically, electrically, hydraulically or pneumatically.

The ASR intervention occurs alternatively by clutch slip in coupling condition 1 or by brake action in coupling condition 3.

The control of the electric machine 4 and the couplings 60, 62, 63 occurs through the different operating states and functions of the drive system according to the following process sequences:

1. Starting of the internal combustion engine 1 (flywheel start):
   i. Release gear (e.g., by the driver);
   ii. Engine coupling 63 is closed;
   iii. Rotor 9 is accelerated to high speed by electric machine 4;
   iv. Braking torque is engaged in electric machine 4 by braking rotor 9 and accelerating stator 8', so that the engine 1 turns over;
2. Starting of the vehicle:
   i. Bridge coupling 60 is opened;
   ii. Rotor 9 is brought to a halt by electric machine 4;
   iii. First gear engaged (e.g., by driver);
   iv. Rotor 9 is electromagnetically accelerated with nominal starting torque, i.e., carried along by stator 8';
   v. When synchronized, bridge coupling 60 is closed;
3. Stationary driving operation with reduction of rotational nonuniformity:
   i. Engine coupling 63 is opened, so that the stator 8' turns freely;
   ii. Stator 8' is brought to a halt by electric machine 4;
   iii. Stop coupling 64 is closed, so that a rigid connection prevails between stator 8' and the crankcase of the engine 1;
   iv. Alternating torque is generated by the electric machine 4 to reduce rotational nonuniformities of the drive shaft 10;
4. Shifting:
   i. Engine drive torque is removed (if necessary, with support from the electric machine) (e.g., by driver);
   ii. Bridge coupling 60 is opened;
   iii. Gear is disengaged (e.g., by driver);
   iv. Rotor 9 is accelerated or braked to that new speed which fulfills the synchronization condition for the new gear to be engaged;
   v. This gear is engaged (e.g., by the driver);
   vi. Bridge coupling 60 is closed;
   vii. Engine drive torque is again applied (e.g., by driver).

A reduction of rotational nonuniformity is also possible in idling, as shown by the following process sequence, which can continue after the above step 1:

5. Idling with reduction of rotational nonuniformity:
   i. Engine coupling 63 is opened, so that the stator 8' turns freely;
   ii. Stator 8' is brought to a halt by electric machine 4;
   iii. Stop coupling 64 is closed, so that a rigid connection prevails between stator 8' and the crankcase of the engine 1;
   iv. Alternating torque is generated by the electric machine 4 to reduce rotational nonuniformities of the drive shaft 10.

The closing of the couplings 60, 63, 64 occurs only at vanishing relative speed each time. The generator function and additional braking or driving torques are implemented—like the synchronization function and the reduction of rotational nonuniformity—with closed bridge coupling 60 and closed stop coupling 64 by appropriate braking or driving torques of the electric machine 4.

Other embodiments start the engine 1 directly, namely, with bridge coupling 60 closed and stop coupling 64 closed.

Figure 10:
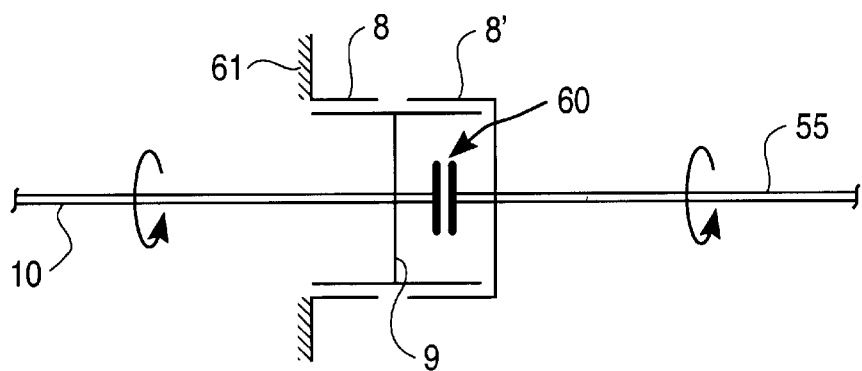
FIG. 10 a schematic representation of another electric machine with electromagnetic operating units that can turn relatively and a stationary operating unit.

The electric machine 4 per FIG. 10 largely corresponds functionally to that shown in FIG. 9, so that the remarks on FIG. 9, as well as 5–8, are also valid here—except as regards the departures mentioned hereafter. A major difference from the machine of FIG. 9 consists in that the switching from "rotating rotor" to "stationary rotor" does not occur mechanically, by opening and closing of couplings, but rather electrically. A further difference consists in that the roles of the drive shaft 10 and the takeoff shaft 55 of the machine 4 shown in FIG. 9 are reversed, which leads to minor departures in the mode of functioning—explained more closely below. In embodiments (not shown), however, the roles of the drive shaft 10 and the takeoff shaft 55 correspond to those of FIG. 9; these embodiments do not show these departures.

In the electric machine 4 shown, the (exterior) stator 8' and the (interior) rotor 9—as mentioned—are firmly joined to the takeoff shaft 55 and the drive shaft 10, respectively, and cannot be decoupled. In addition to the rotary stator 8', the machine 4 is outfitted with a stator 8 prevented from turning, which thrusts against the crankcase 61 (for example). This is immediately adjacent to the rotary stator 8', being displaced in the axial direction (for example) toward the engine 1. It is arranged coaxially to the rotary stator 8' and has the same internal diameter. The windings of the two stators 8', 8 are self-standing, so that they are decoupled or can be decoupled in their generation of magnetic field. The rotor 9 is broad enough that it extends in axial direction over substantially the active surfaces of both stators 8', 8. A bridge coupling 60—as in FIG. 9—couples the drive shaft 10 to the takeoff shaft 50. In other embodiments (not shown), the rotor 9 is on the outside and the stators 8', 8 on the inside.

The shifting between the stationary stator 8 and the rotary stator 8' occurs by means of a switchable power supply unit, here, a suitably switchable invertor. This supplies either the stationary stator 8 for the functions of direct starting, reduction of rotational nonuniformity, vehicle braking and acceleration, and the generator functions, or the rotary stator 8' for the functions of electromagnetic coupling, synchronization, and flywheel starting with the respective currents and voltages required each time, being able to switch inertia-free and without noticeable time delay between them.

Unlike FIG. 9, the function "synchronization" is controlled by generating torque between the rotary stator 8' and the rotor 9, which requires more control engineering because of the thrusting against the variable-speed drive shaft 10. This is because, in the machine 4 of FIG. 10, the bridge coupling 60 viewing in the takeoff direction lies behind the electric machine formed from the stationary stator 8 and the rotor 9, whereas in the machine 4 of FIG. 9, it lies in front of the electric machine with stationary stator. In the embodiment (not shown) in which the roles of the drive shaft 10 and the takeoff shaft 55 are reversed compared to FIG. 10, this functional difference from FIG. 9 does not exist.

In other embodiments, the two stators 8, 8' are simultaneously and independently fed by two independent power supply devices, here, invertors. This enables an execution of the functions assigned to the stationary stator 8, e.g., the generator function and the reduction of rotational nonuniformity, even during the execution of the functions assigned to the rotating stator 8', e.g., the electromagnetic coupling function.

What is claimed is:

1. A drive system for a motor vehicle, comprising:
    a drive system in the form of a combustion engine (1);
    at least one electrical machine (4) coupled with a drive shaft (10), and
    an acceleration slip control,
    wherein the electrical machine (4) is an inverter-controlled three-phase machine arranged in such a way as to permit drive slip reduction by decreasing the drive torque,
    wherein the inverter (17) has an intermediate circuit on a voltage level higher than that of the on-board electrical system, and
    a power storage device (19, 25) on the voltage level of the intermediate circuit which at least partially stores the electrical energy gained during the reduction in drive torque.

2. A drive system according to claim 1 wherein the reduction in drive torque is achieved by means of braking action of the electrical machine (4).

3. A drive system according to claim 1 wherein the electrical machine (4) acts as an electromagnetic clutch inserted in the drive train of the motor vehicle and has two rotatable electromagnetic active units (8, 9, 8, 9), wherein the decrease in drive torque is achieved by means of clutch slip action.

4. A drive system according to claim 2 wherein between the drive system and the electrical machine (4), an automatically actuatable clutch is engaged which is fully or partially opened in order to reduce the drive torque.

5. A drive system according to claim 3 wherein the electromagnetic clutch is equipped with a mechanical torque converter clutch which is released by engaging a clutch slip.

6. A drive system according to claim 1 wherein the electrical machine (4) has the additional function of reducing rotational fluctuations by producing a rapidly varying torque.

7. A drive system according to claim 1 wherein the electrical machine (4) has the function of a starter and/or power supply generator.

8. A drive system according to claim 1 wherein the electrical machine (4) has a high torque density compared with the maximum torque, in particular in excess of 0.01 Nm/cm$^3$.

* * * * *